United States Patent
Levenberg et al.

(10) Patent No.: US 12,467,033 B2
(45) Date of Patent: Nov. 11, 2025

(54) PRODUCTION OF EXTRACELLULAR VESICLES FROM STEM CELLS

(71) Applicant: TECHNION RESEARCH AND DEVELOPMENT FOUNDATION LIMITED, Haifa (IL)

(72) Inventors: Shulamit Levenberg, Moreshet (IL); Shaowei Guo, Haifa (IL); Barak Zohar, Atlit (IL)

(73) Assignee: TECHNION RESEARCH AND DEVELOPMENT FOUNDATION LIMITED, Haifa (IL)

( * ) Notice: Subject to any disclaimer, the term of this patent is extended or adjusted under 35 U.S.C. 154(b) by 365 days.

(21) Appl. No.: 17/194,972

(22) Filed: Mar. 8, 2021

(65) Prior Publication Data
US 2021/0189329 A1    Jun. 24, 2021

Related U.S. Application Data

(63) Continuation-in-part of application No. PCT/IL2020/050641, filed on Jun. 10, 2020.

(60) Provisional application No. 62/978,317, filed on Feb. 19, 2020, provisional application No. 62/866,702, filed on Jun. 26, 2019.

(51) Int. Cl.
*C12N 5/071* (2010.01)

(52) U.S. Cl.
CPC ........ *C12N 5/0602* (2013.01); *C12N 2513/00* (2013.01); *C12N 2527/00* (2013.01)

(58) Field of Classification Search
None
See application file for complete search history.

(56) References Cited

U.S. PATENT DOCUMENTS

| | | | |
|---|---|---|---|
| 11,129,852 B2 | 9/2021 | Offen | |
| 2003/0211130 A1 | 11/2003 | Sanders | |
| 2019/0008902 A1 | 1/2019 | Anderson | |

FOREIGN PATENT DOCUMENTS

| | | |
|---|---|---|
| KR | 20190010490 A | 1/2019 |
| WO | 2017173150 A1 | 10/2017 |
| WO | 2017193075 A1 | 11/2017 |
| WO | 2018226758 A2 | 12/2018 |
| WO | 2019198080 A1 | 10/2019 |
| WO | 2020261257 A1 | 12/2020 |
| WO | 2022038598 A1 | 2/2022 |

OTHER PUBLICATIONS

Patel et al., Enhanced extracellular vesicle production and ethanol-mediated vascularization bioactivity via a 3D-printed scaffold-perfusion bioreactor system, Acta Biomaterialia 95 (2019) 236-244. (Year: 2019).*
Liu et al., Highly Purified Human Extracellular Vesicles Produced by Stem Cells Alleviate Aging Cellular Phenotypes of Senescent Human Cells, Stemcells 2019;37:779-790 (Year: 2019).*
Patel et al., Towards Rationally Designed Biomanufacturing of Therapeutic Extracellular Vesicles: Impact of the Bioproduction Microenvironment, Biotechnol Adv. Dec. 2018 ; 36(8): 2051-2059 (Year: 2018).*
Cabral et al., (2018) Extracellular vesicles as modulators of wound healing. Adv Drug Deliv Rev 129: 394-406.
Chen et al., (2017) Stem Cell-Derived Extracellular Vesicles as a Novel Potential Therapeutic Tool for Tissue Repair. Stem Cells Transl Med 6(9): 1753-1758.
Patel et al., (2018) Towards rationally designed biomanufacturing of therapeutic extracellular vesicles: impact of the bioproduction microenvironment. Biotechnol Adv 36(8): 2051-2059.
Patel et al., (2019) Enhanced extracellular vesicle production and ethanol-mediated vascularization bioactivity via a 3D-printed scaffold-perfusion bioreactor system. Acta Biomater 95: 236-244.
Brahmer et al., (2019) Platelets, endothelial cells and leukocytes contribute to the exercise-triggered release of extracellular vesicles into the circulation. J Extracell Vesicles 8(1): 1615820; 20 pages.
Davidson et al., (2018) Endothelial cells release cardioprotective exosomes that may contribute to ischaemic preconditioning. Sci Rep 8(1): 15885; 9 pages.
Ferro et al., (2014) Dental pulp stem cell (DPSC) isolation, characterization, and differentiation. Methods Mol Biol 1210: 91-115.
Ge et al., (2018) VEGF secreted by mesenchymal stem cells mediates the differentiation of endothelial progenitor cells into endothelial cells via paracrine mechanisms. Mol Med Rep 17(1): 1667-1675.
Greening et al., (2015) A Protocol for Exosome Isolation and Characterization: Evaluation of Ultracentrifugation, Density-Gradient Separation, and Immunoaffinity Capture Methods. In: Posch A. (eds) Proteomic Profiling. Methods in Molecular Biology, vol. 1295; pp. 179-209. Humana Press, New York, NY.
Guescini et al., (2017) Extracellular Vesicles Released by Oxidatively Injured or Intact C2C12 Myotubes Promote Distinct Responses Converging toward Myogenesis. Int J Mol Sci 18(11): 2488; 14 pages.
Guo et al., (2019) Intranasal Delivery of Mesenchymal Stem Cell Derived Exosomes Loaded with Phosphatase and Tensin Homolog siRNA Repairs Complete Spinal Cord Injury. ACS Nano 13(9): 10015-10028.
Kiernan et al., (2016) Systemic Mesenchymal Stromal Cell Transplantation Prevents Functional Bone Loss in a Mouse Model of Age-Related Osteoporosis. Stem Cells Transl Med 5(5): 683-693.
Ku et al., (1981) Development of a hollow-fiber system for large-scale culture of mammalian cells. Biotechnology and Bioengineering 23(1): 79-95.
Kyurkchiev et al., (2014) Secretion of immunoregulatory cytokines by mesenchymal stem cells. World J Stem Cells 6(5): 552-570.

(Continued)

*Primary Examiner* — Kara D Johnson
*Assistant Examiner* — Constantina E Stavrou
(74) *Attorney, Agent, or Firm* — Allan A. Fanucci, Esq.

(57) ABSTRACT

The present invention provides methods and systems for enhanced production and/or secretion of extracellular vesicles from at least one three-dimensional porous scaffold having a population of stem cells cultured thereon, utilizing various shear stress conditions on a variety of stem cells.

18 Claims, 26 Drawing Sheets

(56) References Cited

OTHER PUBLICATIONS

Lesman et al., (2011) Engineering vessel-like networks within multicellular fibrin-based constructs. Biomaterials 32(31):7856-7869.
Liu et al., (2018) Cardiac recovery via extended cell-free delivery of extracellular vesicles secreted by cardiomyocytes derived from induced pluripotent stem cells. Nat Biomed Eng. Author manuscript; available in PMC Oct. 23, 2018. Published in final edited form as: Nat Biomed Eng. May 2018; 2(5): 293-303. Published online Apr. 23, 2018. doi: 10.1038/s41551-018-0229-7; 26 pages.
Nakamura et al., (2015) Mesenchymal-stem-cell-derived exosomes accelerate skeletal muscle regeneration. FEBS Lett 589(11): 1257-1265.
Patel et al., (2018) Enhanced extracellular vesicle production and ethanol-mediated vascularization bioactivity via a 3D-printed scaffold-perfusion bioreactor system. Acta Biomater. Author manuscript; available in PMC Sep. 1, 2020. Published in final edited form as: Acta Biomater. Sep. 1, 2019; 95: 236-244. Published online Nov. 22, 2018. doi: 10.1016/j.actbio.2018.11.024. 21 pages.
Phinney and Pittenger (2017) Concise Review: MSC-Derived Exosomes for Cell-Free Therapy. Stem Cells 35(4): 851-858. With corrigendum.
Shabbir et al., (2015) Mesenchymal Stem Cell Exosomes Induce Proliferation and Migration of Normal and Chronic Wound Fibroblasts, and Enhance Angiogenesis In Vitro. Stem Cells Dev 24(14): 1635-1647.
Théry et al., (2006) Isolation and characterization of exosomes from cell culture supernatants and biological fluids. Curr Protoc Cell Biol Chapter 3: Unit 3.22; 29 pages.
Timmers et al., (2007) Reduction of myocardial infarct size by human mesenchymal stem cell conditioned medium. Stem Cell Res 1(2): 129-137.
Van Niel et al., (2018) Shedding light on the cell biology of extracellular vesicles. Nat Rev Mol Cell Biol; advance online publication; 16 pages.
Watson et al., (2016) Efficient production and enhanced tumor delivery of engineered extracellular vesicles. Biomaterials 105: 195-205.
Xin et al., (2013) Systemic administration of exosomes released from mesenchymal stromal cells promote functional recovery and neurovascular plasticity after stroke in rats. J Cereb Blood Flow Metab 33(11): 1711-1715.
Yamashita et al., (2018) Possibility of Exosome-Based Therapeutics and Challenges in Production of Exosomes Eligible for Therapeutic Application. Biol Pharm Bull 41(6): 835-842.
Zhang Bet al., (2015) HucMSC-Exosome Mediated-Wnt4 Signaling Is Required for Cutaneous Wound Healing. Stem Cells 33(7): 2158-2168.
Zhao et al., (2007) Effects of shear stress on 3-D human mesenchymal stem cell construct development in a perfusion bioreactor system: Experiments and hydrodynamic modeling. Biotechnol Bioeng 96(3): 584-595.
Zohar et al., (2018) Flow-Induced Vascular Network Formation and Maturation in Three-Dimensional Engineered Tissue. ACS Biomater Sci Eng 4(4): 1265-1271.
Zohar et al., (2019) Multi-flow channel bioreactor enables real-time monitoring of cellular dynamics in 3D engineered tissue. Commun Biol 2: 158; 10 pages.
Aguilar-Agon et al., (2019) Mechanical loading stimulates hypertrophy in tissue-engineered skeletal muscle: Molecular and phenotypic responses. J Cell Physiol 234(12): 23547-23558.
Li et al., (2018) Exosomal cargo-loading and synthetic exosome-mimics as potential therapeutic tools. Acta Pharmacol Sin 39(4): 542-551.
Xu et al., (2016) Extracellular vesicle isolation and characterization: toward clinical application. J Clin Invest 126(4): 1152-1162.
Zhuang et al., (2020) Bioprinting of 3D in vitro skeletal muscle models: A review. Materials & Design 193: 108794.
Hergenreider et al., (2012) Atheroprotective communication between endothelial cells and smooth muscle cells through miRNAs. Nat Cell Biol 14(3): 249-256.
Baci et al., (2020) "Extracellular Vesicles from Skeletal Muscle Cells Efficiently Promote Myogenesis in Induced Pluripotent Stem Cells," Cells 9(6): 1527 (21 pages).
Forterre et al., (2014) "Proteomic analysis of C2C12 myoblast and myotube exosome-like vesicles: a new paradigm for myoblast-myotube cross talk?," PLoS One 9(1): e84153 (12 pages).
Guo et al., (2021) "Stimulating Extracellular Vesicles Production from Engineered Tissues by Mechanical Forces," Nano Lett 21(6): 2497-2504.
Yan et al., (2020) "Exosomes derived from umbilical cord mesenchymal stem cells in mechanical environment show improved osteochondral activity via upregulation of LncRNA H19," J Orthop Translat 26: 111-120.
Yuan et al., (2019) "Exosomes Derived from Human Primed Mesenchymal Stem Cells Induce Mitosis and Potentiate Growth Factor Secretion," Stem Cells Dev 28(6): 398-409.

\* cited by examiner

Flow 6 mm 0.3 mm

PRODUCTION OF EXTRACELLULAR VESICLES FROM STEM CELLS

CROSS-REFERENCE TO RELATED APPLICATIONS

This application is a Continuation-in-Part of PCT/IL2020/050641, filed Jun. 10, 2020; which claims priority to U.S. Provisional Application No. 62/866,702, filed Jun. 26, 2019 and U.S. Provisional Application No. 63/978,317, filed Feb. 19, 2020; the contents of all of which are incorporated herein by reference in their entirety.

FIELD OF THE INVENTION

Provided herein are systems and methods for enhanced secretion of extracellular vesicles from stem cells utilizing various flow-induced shear stress conditions on a variety of stem cells cultured on three-dimensional porous scaffolds.

BACKGROUND OF THE INVENTION

Mesenchymal stem cells (MSCs) are one of the most commonly employed cell types under investigation as an experimental cell-based therapy for treating a vast array of human diseases. Their widespread use stems from their demonstrated potency in a broad range of experimental animal models of disease and their excellent safety profile in humans (D. G. Phinney and M. F. Pittenger, "Concise Review: MSC-Derived Exosomes for Cell-Free Therapy," Stem Cells, 2017). Results indicate that MSCs play several simultaneous roles: aiding healing by expressing growth factors (Q. Ge et al., "VEGF secreted by mesenchymal stem cells mediates the differentiation of endothelial progenitor cells into endothelial cells via paracrine mechanisms.," Mol. Med. Rep., vol. 17, no. 1, pp. 1667-1675 January 2018); altering host immune responses by secreting immuno-modulatory proteins (D. Kyurkchiev et al., "Secretion of immunoregulatory cytokines by mesenchymal stem cells.," World J. Stem Cells, vol. 6, no. 5, pp. 552-570, November 2014); and serving as mature functional cells in some tissues such as bone (J. Kiernan, S. Hu, M. D. Grynpas, J. E. Davies, and W. L. Stanford, "Systemic Mesenchymal Stromal Cell Transplantation Prevents Functional Bone Loss in a Mouse Model of Age-Related Osteoporosis," Stem Cells Transl. Med., vol. 5, no. 5, pp. 683-693, May 2016).

Exosomes are typically 40-150 nm sized extracellular vesicles (EVs) that are released from a multitude of cell types, and perform diverse cellular functions including intercellular communication, antigen presentation, and transfer of tumorigenic proteins, mRNA and miRNA. Exosomes are important regulators of the cellular niche, and their altered characteristics in many diseases, such as cancer, suggest their importance for diagnostic and therapeutic applications, and as drug delivery vehicles. Protocols for isolation and purification of exosomes and EVs are known. For example, Greening et al., describes protocols and key insights into the isolation, purification and characterization of exosomes, distinct from shed microvesicles and apoptotic blebs (D. W. Greening, R. Xu, H. Ji, B. J. Tauro, and R. J. Simpson, "A protocol for exosome isolation and characterization: Evaluation of ultracentrifugation, density-gradient separation, and immunoaffinity capture methods," in Methods in Molecular Biology, 2015).

The majority of the studies demonstrated that MSC exosomes recapitulate in large part the paracrine nature and scope of that previously devoted to the MSC action in animal models of disease. For example, various groups have confirmed that MSC-derived exosomes exhibit cardio and renal-protective activity (L. Timmers et al., "Reduction of myocardial infarct size by human mesenchymal stem cell conditioned medium," Stem Cell Res., vol. 1, no. 2, pp. 129-137, November 2007), are efficacious in animal models of stroke (H. Xin, Y. Li, Y. Cui, J. J. Yang, Z. G. Zhang, and M. Chopp, "Systemic administration of exosomes released from mesenchymal stromal cells promote functional recovery and neurovascular plasticity after stroke in rats," J. Cereb. Blood Flow Metab., vol. 33, no. 11, pp. 1711-1715 November 2013), and promote re-epithelialization of cutaneous wounds by inducing epithelial cell proliferation (B. Zhang et al., "HucMSC-Exosome Mediated-Wnt4 Signaling Is Required for Cutaneous Wound Healing," Stem Cells, vol. 33, no. 7, pp. 2158-2168 July 2015) and angiogenesis (A. Shabbir, A. Cox, L. Rodriguez-Menocal, M. Salgado, and E. Van Badiavas, "Mesenchymal Stem Cell Exosomes Induce Proliferation and Migration of Normal and Chronic Wound Fibroblasts, and Enhance Angiogenesis In Vitro.," Stem Cells Dev., vol. 24, no. 14, pp. 1635-1647 July 2015). Collectively, these studies readily demonstrate that MSC-derived exosomes recapitulate to a large extent the immensely broad therapeutic effects previously attributed to MSCs.

Despite the success of exosomes as a cell-free therapy in these studies, a major challenge to the translational path is the limited yield of exosome production. In order to increase extracellular vesicle (such as exosomes) production, bioreactors can be used.

For example, D. B. Patel et al. discloses the use of a 3D-printed scaffold-perfusion bioreactor system to assess the response of dynamic culture on extracellular vesicle production from endothelial cells (ECs) (D. B. Patel, C. R. Luthers, M. J. Lerman, J. P. Fisher, and S. M. Jay, "Enhanced extracellular vesicle production and ethanol-mediated vascularization bioactivity via a 3D-printed scaffold-perfusion bioreactor system," Acta Biomater., pp. 1-9, 2018).

Watson, D. C et al. discloses a hollow-fiber bioreactor for the efficient production of bioactive extracellular vesicles bearing the heterodimeric cytokine complex Interleukin-15: Interleukin-15 receptor alpha (Watson, D. C., Bayik, D., Srivatsan, A., Bergamaschi, C., Valentin, A., Niu, G., et al., J. C. (2016). "Efficient production and enhanced tumor delivery of engineered extracellular vesicles". Biomaterials, 105, 195-205).

Zhao, F., et al. disclosed a perfusion bioreactor system for analyzing the biomechanical characteristics of human mesenchymal stem cells (hMSCs) within highly porous 3-D poly(ethylene terephthalate) (PET) matrices (Zhao, F., et al. "Effects of shear stress on 3-D human mesenchymal stem cell construct development in a perfusion bioreactor system: Experiments and hydrodynamic modeling." Biotechnology and bioengineering, vol. 96, no. 3, pp. 584-595, 2007).

International Pub. No. WO 2017/193075 discloses the production, isolation, and collection of cellular products released or secreted from cells. Cells are expanded in the intracapillary or extracapillary space of a bioreactor and release cellular products, including EVs, into the fluid space of the bioreactor.

US Pub. No. 2019/0008902 discloses a method for large-scale purification of a population of cell-derived vesicles, comprising: (a) applying a tangential flow filtration to conditioned media produced by a population of isolated stem cells cultured in a bioreactor to isolate a cell-derived vesicles containing fraction, optionally wherein the bioreactor is a hollow fiber bioreactor; and (b) concentrating the cell-derived vesicle containing fraction to provide a purified population of cell-derived vesicles.

Korean Pub. No. 20190010490 discloses a method of inducing efficient secretion of extracellular endoplasmic reticulum by using a perfusion bioreactor and a perfusion culture method. The method has an effect of continuously obtaining a cell-derived material while allowing a cell culture fluid to flow through the cell to help the cell proliferation.

However, there are several drawbacks associated with the previously known methods. There remains an unmet need for simple and cost-efficient methods for inducing advanced secretion of extracellular vesicles from stem cells cultured on three-dimensional porous scaffolds.

SUMMARY OF THE INVENTION

The present invention provides systems and methods for inducing advanced production and/or secretion of extracellular vesicles from stem cells. The methods of the present invention comprise culturing stem cells on a three-dimensional (3D) porous scaffold within a bioreactor system, and inducing mechanical stimulations in the form of shear stress on the cells, by flowing and/or circulating a medium within the bioreactor system at various flow rates or flow regimes, and/or moving the 3D porous scaffold within the bioreactor system. These mechanical stimulations induce physiological changes in the cells that result in enhanced secretion of EVs and in some embodiments result in improved biological effect of the EVs on mammalian cells.

The present inventors have surprisingly discovered that various levels of shear stress stimulations induced on stem cells cultured on a 3D porous scaffold, in the form of different flow rates or flow regimes or direct movement of the 3D porous scaffold, can significantly enhance extracellular vesicles secretion from stem cells cultured in three-dimensional porous scaffolds.

Advantageously, it was discovered that circulating a medium within the bioreactor system at specific flow rates significantly enhanced extracellular vesicles secretion from a three-dimensional porous scaffold having dental pulp stem cells (DPSCs) adhered therein. Moreover, it was discovered that the three-dimensional porous scaffold sample which was subjected to flow-induced shear stress at a specific flow rate exhibited an exceptionally high level of extracellular vesicles secretion, which was about 60-times higher than compared to a static control three-dimensional porous scaffold sample.

Thus, according to some embodiments, the present invention provides a method for producing extracellular vesicles (EVs) from stem cells, the method comprising the steps of: (a) providing a population of stem cells cultured on at least one three-dimensional porous scaffold; (b) providing conditions for three-dimensional multi-layer expansion of the stem cells cultured on the at least one three-dimensional porous scaffold; (c) providing shear stress stimulations at above about 0.5 dyne/cm² to said population of stem cells, wherein the population of stem cells secretes extracellular vesicles into a medium; (d) collecting the medium; and (e) isolating the secreted EVs dispersed therein.

According to some embodiments, at step (c) the shear stress stimulations are in the range of about 0.5 to about 100 dyne/cm². According to some embodiments, at step (c) the shear stress stimulations are in the range of about 5 to about 30 dyne/cm².

According to some embodiments, the stem cells are seeded and cultured on the least one three-dimensional porous scaffold prior to providing shear stress stimulations thereto.

According to some embodiments, step (a) comprises providing a system configured to deliver a medium through a population of stem cells, the system comprising: a flow chamber comprising an inlet port, an outlet port, and at least one flow chamber wall defining an internal chamber; an oxygenator; a medium reservoir comprising the medium; and a pump, wherein the flow chamber, the oxygenator, the medium reservoir and the pump are in fluid communication with each other. According to some embodiments, at least one of the oxygenator and the flow chamber are disposed within the medium reservoir. According to some embodiments, step (b) is performed within the flow chamber, wherein the at least one three-dimensional porous scaffold is disposed within the flow chamber.

According to some embodiments, step (c) comprises flowing the medium into the flow chamber, wherein the medium enters the flow chamber through the inlet port at the predetermined flow rate, flows through the at least one three-dimensional porous scaffold, and exits through the outlet port, thereby providing shear stress stimulations to the population of stem cells cultured thereon. According to some embodiments, the predetermined flow rate is in the range of about 0.01 to about 100 ml/min. According to some embodiments, the predetermined flow rate is in the range of about 0.1 to about 10 ml/min. According to some embodiments, at step (c) the medium flows through the at least one three-dimensional porous scaffold at a flow velocity in the range of about 0.1 to about 100 cm/min. According to some embodiments, the flow velocity in the range of about 0.1 to about 5 cm/min.

According to some embodiments, step (c) comprises moving the at least one three-dimensional porous scaffold within the flow chamber, thereby providing shear stress stimulations to the population of stem cells cultured thereon. According to some embodiments, the movement of the at least one three-dimensional porous scaffold within the flow chamber is selected from agitating, vibrating, rotating, waving, or tilting the at least one three-dimensional porous scaffold.

According to some embodiments, step (c) is performed for about 1 hour to about 30 days. According to some embodiments, step (c) is performed for about 2 hours to about 24 hours. According to some embodiments, step (c) is performed for about 48 hours.

According to some embodiments, the flow chamber is a reactor. According to some embodiments, the reactor is a bioreactor. According to some embodiments, the flow chamber is a reactor selected from the group consisting of: laminar flow reactor (LFR), plug flow reactor (PFR), continuous stirred-tank reactor (CSTR), batch reactor, heterogenous catalytic reactor, fed-batch bioreactor, perfusion bioreactor, fix-bed bioreactor, packed bed bioreactor, wave bioreactor, air lift bioreactor, and vibrating bed. According to some embodiments, the flow chamber is not a hollow fiber bioreactor (HFBR). According to some embodiments, the system as presented herein does not comprise a hollow fiber bioreactor.

According to some embodiments, the at least one three-dimensional porous scaffold comprises at least one material selected from the group consisting of: polyester, polypropylene, polylactic acid (PLA), Poly-L-lactic acid (PLLA), poly(lactic-co-glycolic acid) (PLGA), polycaprolactone (PCL), cellulose, silk, glass, and natural and synthetic hydrogels selected from: gelatin, collagen, fibrin, PEG, alginate, and chitosan. According to some embodiments, the at least one three-dimensional porous scaffold comprises polyester and polypropylene.

According to some embodiments, the at least one three-dimensional porous scaffold is in a shape selected from the group consisting of a disc, a cylinder, and a sphere. According to some embodiments, the at least one three-dimensional porous scaffold has at least one dimension having a length selected from a range of about 1 µm to about 500 mm. According to further embodiments, the length of the at least one dimension is selected from the range of about 5 µm to about 50 µm.

According to some embodiments, the at least one three-dimensional porous scaffold comprises a plurality of three-dimensional porous scaffolds.

According to some embodiments, the extracellular vesicles are selected from the group consisting of: exosomes, microvesicles, apoptotic bodies, and ectosomes. According to some embodiments, the extracellular vesicles are exosomes.

According to some embodiments, the stem cells are human stem cells. According to some embodiments, the stem cells are naïve or engineered human stem cells. According to some embodiments, the stem cells are naïve human stem cells. According to other embodiments, the stem cells are engineered human stem cells. According to some embodiments, the stem cells are selected from the group consisting of: adult stem cells, embryonic stem cells (ESCs), induced pluripotent stem cells, cord blood stem cells and amniotic fluid stem cells. According to some embodiments, the adult stem cells are selected from the group consisting of: neural stem cells, skin stem cells, epithelial stem cells, skeleton muscle satellite cells, mesenchymal stem cells, adipose-derived stem cells, endothelial stem cells, dental pulp stem cells (DPSCs), hematopoietic stem cells and placenta derived stem cells. According to some embodiments, the adult stem cells are dental pulp stem cells (DPSCs).

According to some embodiments, the medium comprises at least one material selected from the group consisting of: water, salts, nutrients, minerals, vitamins, amino acids, nucleic acids, proteins (such as cytokines and growth factors), hormones, and serum.

According to some embodiments, the conditions for multi-layer expansion of the stem cells at step (b) comprises providing the stem cell with at least one of: a temperature in the range of about 36 to about 38° C., a humidity in the range of about 80% to about 95%, a dissolved oxygen (DO) content of about 20% to about 90%, a pH selected from the range of about 7 to about 7.6, applying zero or low shear stress conditions during the seeding and cultivation of the population of stem cells on the at least one three-dimensional porous scaffold, and combinations thereof.

According to some embodiments, at step (e) the secreted extracellular vesicles are isolated utilizing a differential centrifugation procedure.

According to some embodiments, the flow chamber comprises a first surface comprising the inlet port, a second surface positioned substantially parallel thereto comprising the outlet port, wherein the at least one flow chamber wall is positioned perpendicularly to the first surface and the second surface, and wherein the at least one flow chamber wall is extending from the first surface to the second surface. According to some embodiments, the at least one flow chamber wall is substantially shaped as a cylinder.

According to some embodiments, the system further comprises at least one or more sensors for measuring in the medium at least one parameter selected from the group consisting of pressure, flow rate, temperature, pH, dissolved oxygen, concentration of medium components, and extracellular vesicles quantity. According to some embodiments, the system further comprises a control unit in operative communication with the at least one or more sensors, configured to receive measurements of the at least one parameter and adjust the at least one parameter based on the measurements.

According to some embodiments, the present invention provides a system configured to deliver a medium through a population of cultured stem cells, the system comprising: a flow chamber comprising: an inlet port, an outlet port, and at least one flow chamber wall defining an internal chamber; an oxygenator; a medium reservoir comprising a medium; and a pump, wherein the flow chamber, the oxygenator, the medium reservoir and the pump are in fluid communication with each other. According to some embodiments, the flow chamber is selected from the group consisting of: laminar flow reactor (LFR), plug flow reactor (PFR), continuous stirred-tank reactor (CSTR), batch reactor, heterogenous catalytic reactor, fed-batch bioreactor, perfusion bioreactor, fix-bed bioreactor, packed bed bioreactor, wave bioreactor, air lift bioreactor, and vibrating bed.

According to some embodiments, the present invention provides extracellular vesicles produced according to any of the methods presented herein above.

According to some embodiments, the extracellular vesicles produced according to any of the methods presented herein above comprises at least one upregulated protein, selected from the group consisting of: RhoG, ITGAV, CAPZA2, CKAP5, CDH13, ARPC2, ARPC4, MYH11, TUBA1B, TUBB, TUBB2B, TUBB2A, and combinations thereof.

According to some embodiments, the present invention provides extracellular vesicles characterized by at least one marker selected from CD9, CD63, and CD81, and comprising at least one upregulated protein selected from the group consisting of: RhoG, ITGAV, CAPZA2, CKAP5, CDH13, ARPC2, ARPC4, MYH11, TUBA1B, TUBB, TUBB2B, TUBB2A, and combinations thereof.

According to some embodiments, the present invention provides a composition comprising the extracellular vesicles produced according to any one of the methods presented herein above.

According to some embodiments, the extracellular vesicles or the composition as was presented herein above are for use in the prevention or treatment of a disease or disorder. According to some embodiments, the disease or disorder is selected from the group consisting of: inflammatory diseases; autoimmune diseases; blood vessel diseases; cardiac diseases; respiratory system diseases; skeletal system diseases; gastrointestinal tract diseases; kidney disease; urinary tract diseases; skin diseases; ageing associated diseases; peripheral nerve and skeletal muscle diseases; diseases of the central nervous system; eye diseases; diseases of the endocrine system; cancer; diabetes; peripheral neuropathy; spinal cord injuries; stroke; and dental and oral diseases.

According to some embodiments, the present invention provides a method of prevention or treatment of a disease or disorder, comprising administering to a subject in need thereof a composition comprising the extracellular vesicles produced according to any of the methods presented herein above. According to some embodiments, the disease or disorder is selected from the group consisting of: inflammatory diseases; autoimmune diseases; blood vessel diseases; cardiac diseases; respiratory system diseases; skeletal system diseases; gastrointestinal tract diseases; kidney disease; urinary tract diseases; skin diseases; ageing associated diseases; peripheral nerve and skeletal muscle diseases; diseases of the central nervous system; eye diseases; diseases of the endocrine system; cancer; diabetes; peripheral neuropathy; spinal cord injuries; stroke; and dental and oral diseases.

According to some embodiments, the present invention provides a method for producing extracellular vesicles (EVs) from naïve or engineered stem cells, the method comprising the steps of: (a) providing shear stress stimulations to a population of stem cells cultured on at least one three-dimensional porous scaffold, wherein the population of stem cells secretes extracellular vesicles into the medium; (b) collecting the medium; and (c) isolating the secreted extracellular vesicles (EVs) dispersed therein.

Certain embodiments of the present invention may include some, all, or none of the above advantages. Further advantages may be readily apparent to those skilled in the art from the figures, descriptions, and claims included herein. Aspects and embodiments of the invention are further described in the specification herein below and in the appended claims.

Unless otherwise defined, all technical and scientific terms used herein have the same meaning as commonly understood by one of ordinary skill in the art to which this invention pertains. In case of conflict, the patent specification, including definitions, governs. As used herein, the indefinite articles "a" and "an" mean "at least one" or "one or more" unless the context clearly dictates otherwise.

The following embodiments and aspects thereof are described and illustrated in conjunction with systems, tools and methods which are meant to be exemplary and illustrative, but not limiting in scope. In various embodiments, one or more of the above-described problems have been reduced or eliminated, while other embodiments are directed to other advantages or improvements.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

In the Figures.

15C) markers graphs, as detected by flow cytometry using MACSplex Kit on flow induced EVs. The clusters shifted right in the graphs indicating captured EVs for the specific marker, as compared to control beads on the left.

Figure 16A:
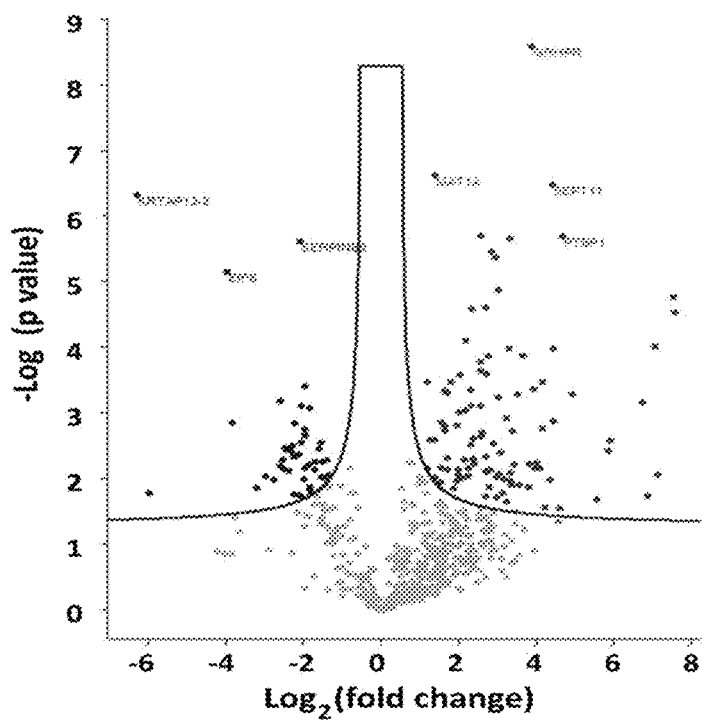
Figure 16B:
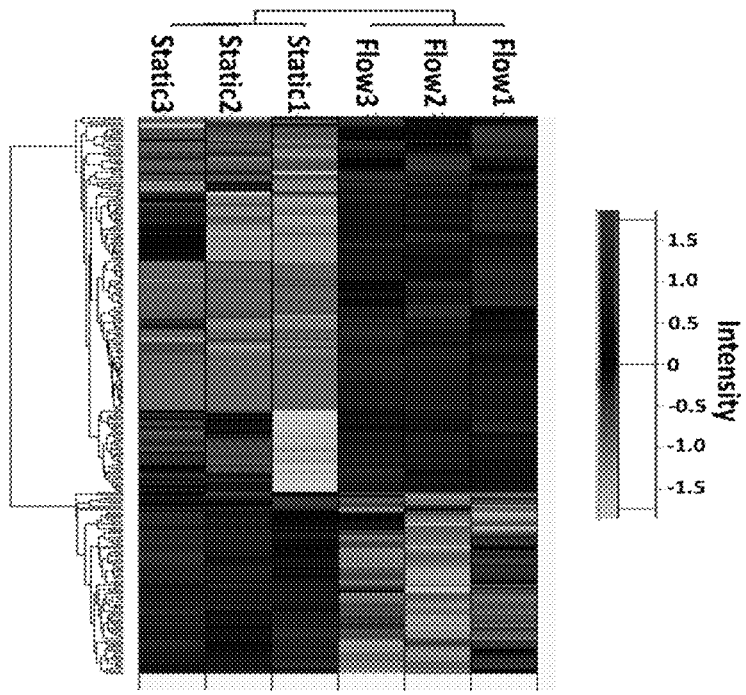

FIGS. 16A to 16B illustrates proteomic analysis of flow-stimulated EVs compared with static EVs: Volcano plot showing upregulated (dark grey, right side) and downregulated (dark grey, left side) proteins in flow-stimulated EVs compared with 3D static EVs (FIG. 16A), and a Heat map showing the clustering of differentially expressed proteins (FIG. 16B). Flow 1-3 indicate replicates of flow-stimulated samples, whereas Static 1-3 indicate replicates of static EVs samples (n=3 per group).

Figure 17A:
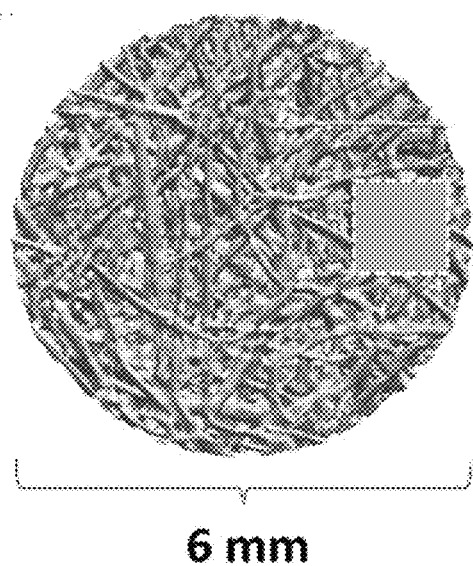
Figure 17B:
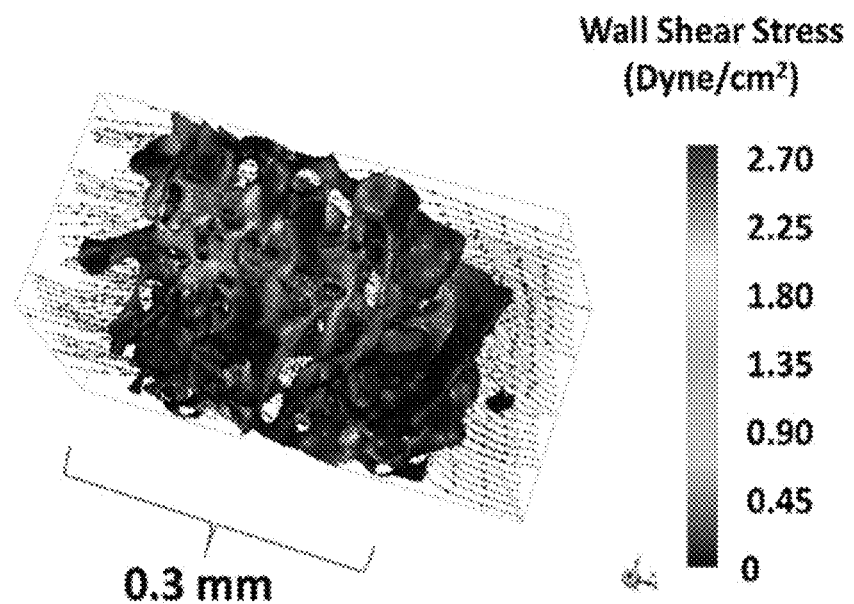
Figure 18A:
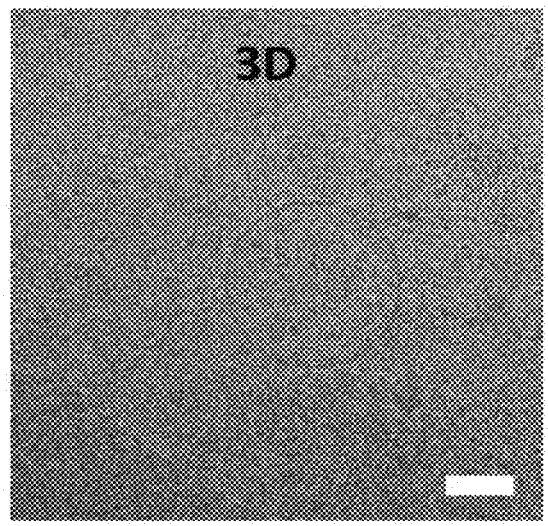
Figure 18B:
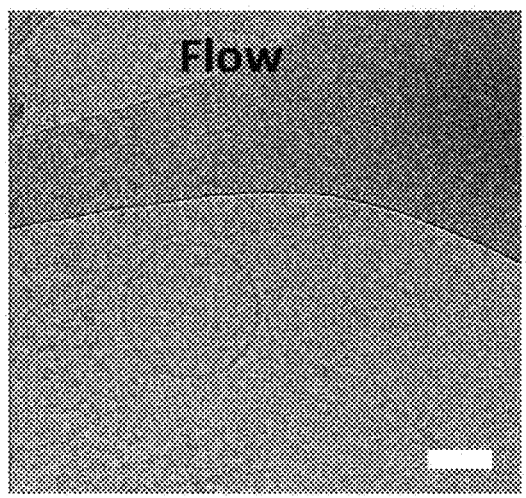
Figure 18C:
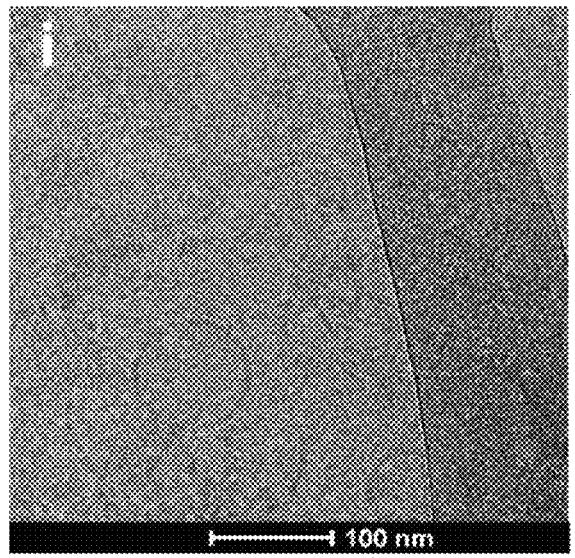
Figure 18D:
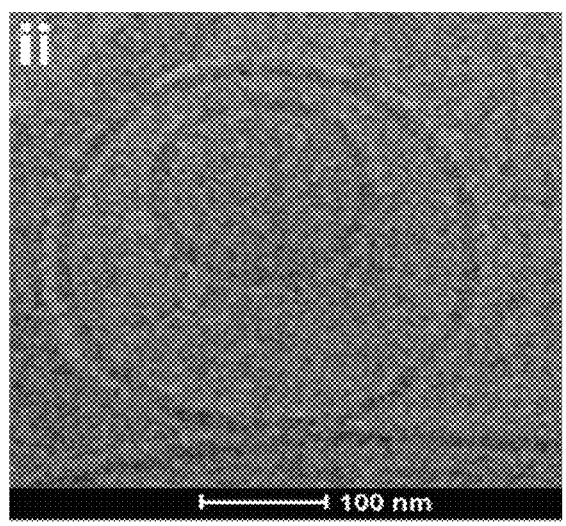
Figure 18E:
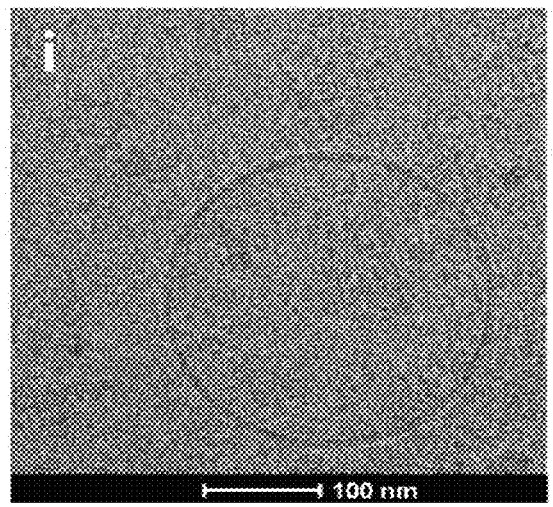
Figure 18F:
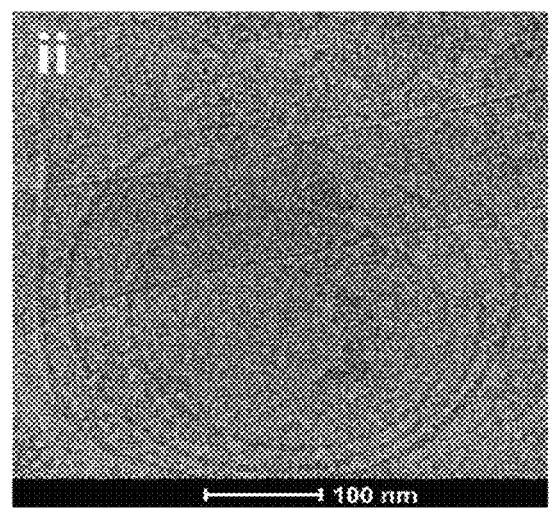

FIGS. 17A to 17B illustrates the application of flow shear stress on 3D engineered tissues for EVs production: micro-CT scaffold for shear induced EVs production (FIG. 17A), and computational Fluid Dynamics (CFD) simulation for wall shear stress applied on scaffold representative segment (FIG. 17B).

FIGS. 18A to 18F illustrates Cryo-EM imaging of: EVs from 3D static (FIG. 18A) or flow group (FIG. 18B) displaying typical cup-shape structure; representative images of 3D static group (FIGS. 18C-D), and representative images of flow groups (FIGS. 18E-F) displaying double-membrane structures of various sizes, and big vesicles containing internal smaller vesicles. Scale bar=100 μm.

Figure 19A:
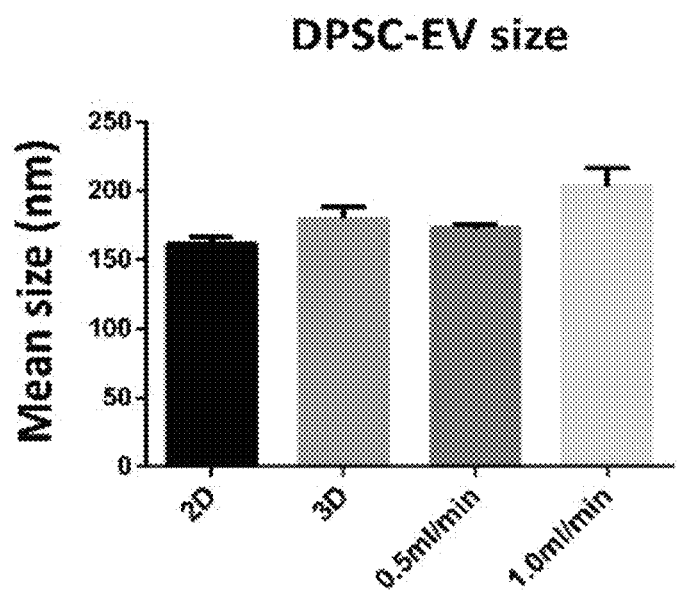
Figure 19B:
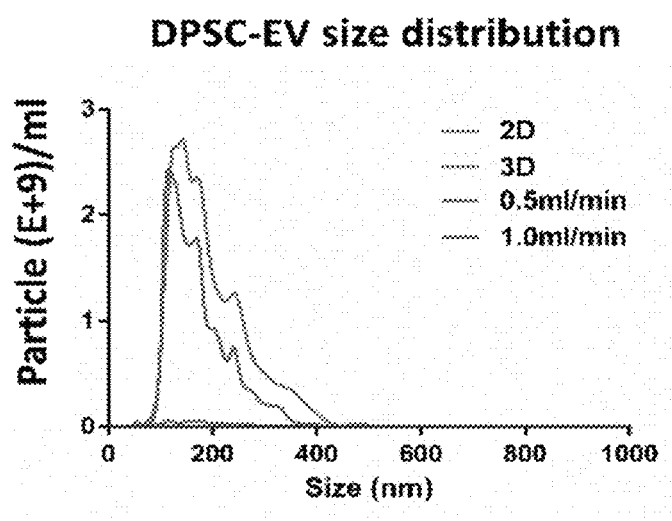

FIGS. 19A to 19B illustrates EV size (FIG. 19A) or size distribution (FIG. 19B) of DPSCs under 2D (n=7), 3D static (n=11), 0.5 ml/min (n=3), or 1.0 ml/min (n=8) conditions.

FIGS. 20A to 20E illustrates EV production mediated by YAP mechano-transducer: Immunofluorescence imaging of DPSC (FIG. 20A) or MSC (FIG. 20B) embedded scaffolds under static or flow stimulation (Scale bar=50 μm); quantification of nucleus YAP intensity of DPSC (FIG. 20C) or MSC (FIG. 20D) embedded scaffolds under static or flow stimulation (N=3 per group), and EV yield of DPSC (FIG. 20E) embedded in 3D scaffold under flow stimulation, flow with YAP inhibitor-Verteporfin (Flow+V), static control, and static with Verteporfin (Static+V). One-way ANOVA with post-hoc Tukey's multiple comparisons. Two-tailed Student's t-test. *, *** represent statistical significance of P value≤0.05, 0.001, respectively.

DETAILED DESCRIPTION

The present invention provides systems and methods for inducing advanced secretion of extracellular vesicles from stem cells.

As used herein, the terms "extracellular vesicles" and "EVs" are interchangeable, and refers to lipid bilayer-delimited particles that are released from stem cells naturally or following stimulations. The stimulations can include flow-induced shear stress stimulations therethrough by a fluid, wherein the flow characteristics of the fluid such as rate, velocity, and regime (such as direct flow, indirect flow, pulse-like manner flow, etc.) affect the resulting stimulations. Additionally, the shear stress stimulations can be generated by the movement of the stem cells embedded scaffolds within the fluid, such as vibrating or agitating the stem cells embedded scaffolds within the fluid.

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure. In the figures, like reference numerals refer to like parts throughout.

Figure 1A:
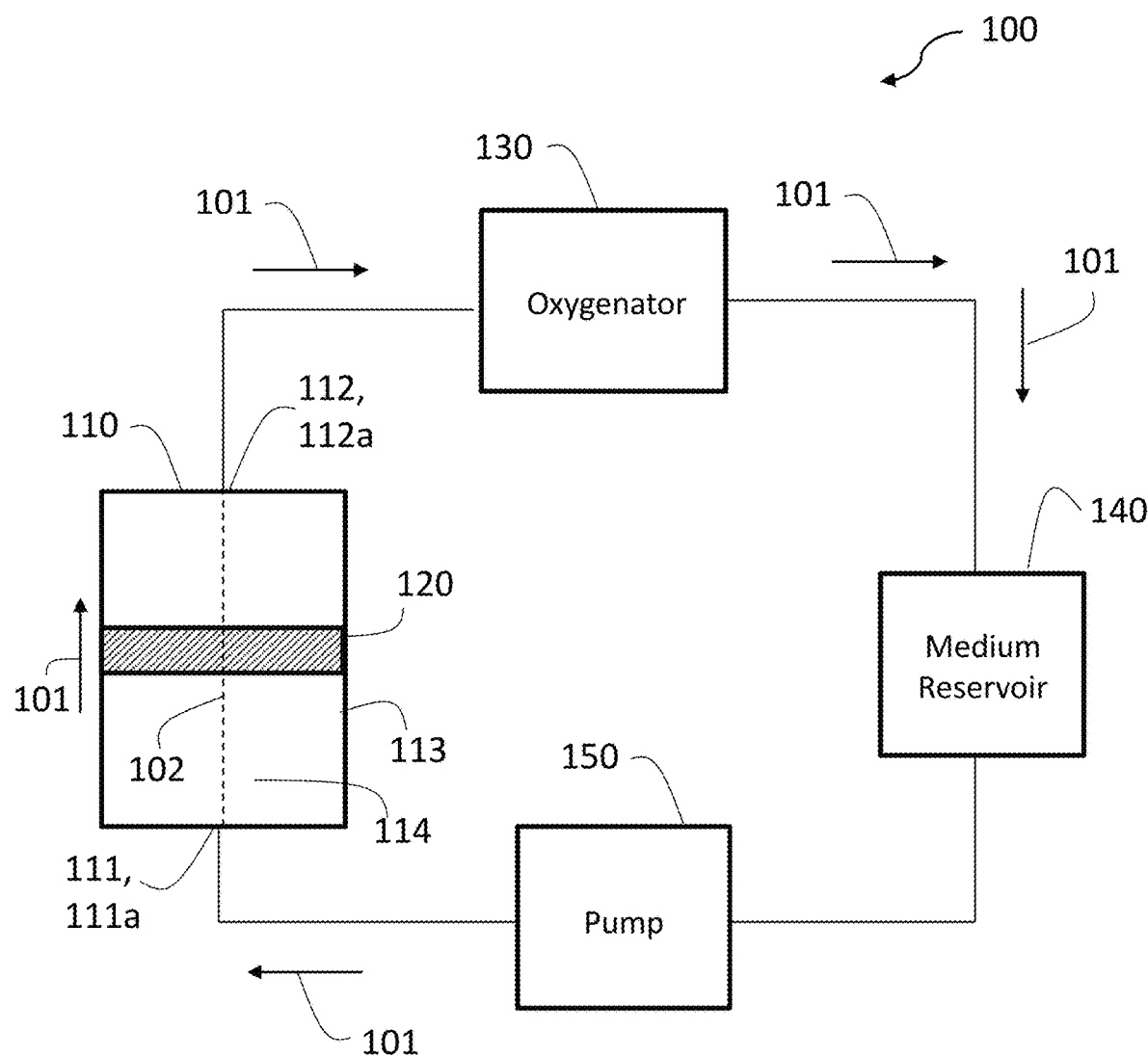
FIG. 1A constitutes a functional block diagram depicting a system 100 through different embodiments of the present invention.
Figure 1B:
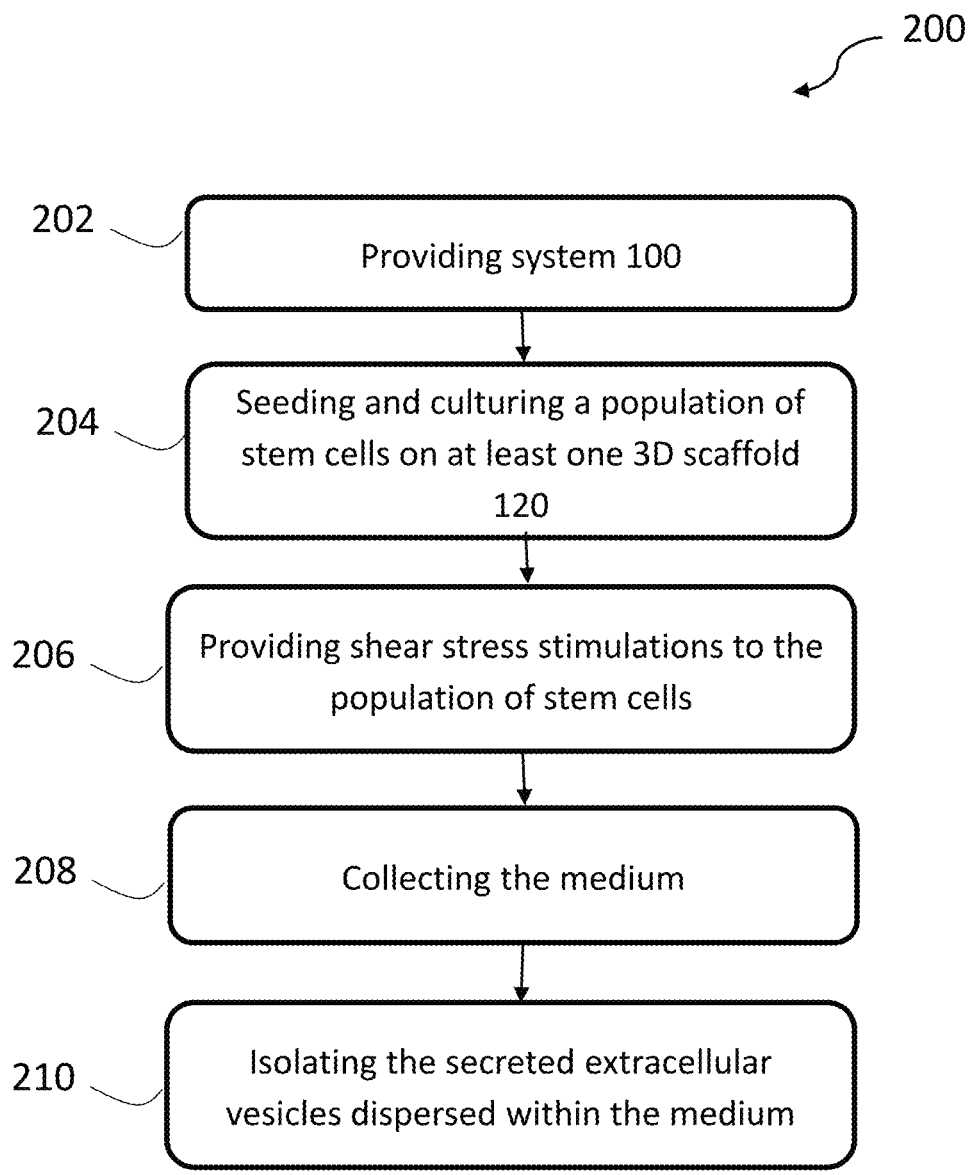
FIG. 1B is a flowchart of a method 200 for producing extracellular vesicles from stem cells, in some embodiments of the present invention.

Reference is now made to FIGS. 1A-1B. FIG. 1A constitutes as a functional block diagram depicting system 100 through different embodiments of the present invention. FIG. 1B is a flowchart of a method 200 for producing extracellular vesicles from stem cells, in some embodiments of the present invention.

According to some embodiments, there is provided a system configured to deliver a medium through a population of cultured stem cells. According to some embodiments, the system is a system 100. According to some embodiments, system 100 is configured to deliver a medium through a population of cultured stem cells. According to some embodiments, system 100 is a system appropriate for supporting seeding, growth and expansion of stem cells and secretion of EVs from said stem cells.

According to some embodiments, system 100 comprises a flow chamber 110; an oxygenator 130; a medium reservoir 140 comprising a medium; and a pump 150. According to some embodiments, flow chamber 110, oxygenator 130, medium reservoir 140 and pump 150 are in fluid communication with each other. According to further embodiments, flow chamber 110, oxygenator 130, medium reservoir 140 and pump 150 are in fluid communication with each other via appropriate fluid communication appliances, such as but not limited to, pipes, fibers, lines, tubes, conduits, ducts, or any other known communication appliances in the art. Each possibility represents a separate embodiment of the present invention. According to further embodiments, flow chamber 110, oxygenator 130, medium reservoir 140 and pump 150 are in fluid communication with each other via silicone tubes or pipes.

According to some embodiments, flow chamber 110 is a reactor. According to further embodiments, the reactor is a bioreactor. According to some embodiments, flow chamber 110 is a bioreactor. According to further embodiments, system 100 is a bioreactor system 100.

According to some embodiments, flow chamber 110 is disposed within medium reservoir 140 (not shown). According to some embodiments, flow chamber 110 is an integral part of medium reservoir 140 (not shown).

According to some embodiments, flow chamber 110 comprises an inlet port 111, an outlet port 112, and at least one flow chamber wall 113 defining an internal chamber 114. According to some embodiments, flow chamber 110 comprises a first surface 111a comprising inlet port 111 and a second surface 112a positioned substantially parallel thereto, comprising outlet port 112. According to some embodiments, the at least one flow chamber wall 113 is positioned perpendicularly to first surface 111a and second surface 112a. According to some embodiments, the at least one flow chamber wall 113 is extending from the first surface 111a to the second surface 112a.

As used herein, the term "substantially" refers to the complete or nearly complete extent or degree of a characteristic property. For example, a substantially parallel surface may be a parallel surface, or a surface that is inclined in an angle that is bellow about 5°.

According to some embodiments, flow chamber 110 has a three-dimensional (3D) structure. According to some embodiments, flow chamber 110 has a shape or a structure adapted to accommodate within an at least one three-dimensional porous scaffold 120. According to some embodiments, flow chamber 110 has a shape or a structure adapted to accommodate within an at least one three-dimensional porous scaffold 120, and enable medium flow therethrough, wherein the at least one three-dimensional porous scaffold 120 is disposed within the internal chamber 114. According to some embodiments, the at least one three-dimensional porous scaffold 120 is disposed within the flow chamber 110. According to some embodiments, the at least one three-dimensional porous scaffold 120 comprises a population of stem cells adhered thereto. According to some embodiments, the at least one three-dimensional porous scaffold 120 comprises a population of stem cells cultured thereon. According to some embodiments, the population of stem cells produced and/or secrets extracellular vesicles into the medium flowing therethrough.

According to some embodiments, flow chamber 110 is adapted to accommodate within an at least one three-dimensional porous scaffold 120, and enable direct medium flow therethrough. According to some embodiments, flow chamber 110 is adapted to enable the movement of the at least one three-dimensional porous scaffold 120 within the internal chamber 114. According to some embodiments, the movement of the at least one three-dimensional porous scaffold 120 within the internal chamber 114 is selected from agitating, vibrating, rotating, waving, tilting, or any other form of movement known in the art. Each possibility represents a separate embodiment of the present invention. According to some embodiments, flow chamber 110 further comprises an electric component or an actuator configured to generate the movement of the at least one three-dimensional porous scaffold 120 within the internal chamber 114 as was disclosed herein.

The term "actuator", as used herein, refers to any powered actuator known in the art for providing rotational motion, such as an electric motor, a solenoid, and the like.

As used herein the terms "direct medium flow" or "direct flow" are interchangeable, and refers to a specific configuration of flow chamber 110, wherein the medium enters to the flow chamber 110 through the inlet port 111 and is forced through the at least one three-dimensional porous scaffold 120 to transfer shear stress directly to the stem cells adhered thereto.

According to some embodiments, the inlet port 111 is positioned substantially directly from the at least one three-dimensional porous scaffold 120, along a central vertical axis 102. According to some embodiments, the inlet port 111 is spaced from the at least one three-dimensional porous scaffold 120. According to some embodiments, the inlet port 111 is positioned along the central vertical axis 102, as illustrated at FIG. 1A. According to some embodiments, at least a portion of the at least one three-dimensional porous scaffold 120 is positioned along the central vertical axis 102.

According to some embodiments, flow chamber 110 is adapted to accommodate within an at least one three-dimensional porous scaffold 120, and enable direct perfusion medium flow therethrough.

As used herein the terms "direct perfusion medium flow" or "direct perfusion flow" are interchangeable, and refers to a perfusion flow chamber 110, wherein the medium enters the perfusion flow chamber 110 through the inlet port 111 and is forced through the at least one three-dimensional porous scaffold 120.

As used herein the terms "perfusion bioreactor" or "open loop perfusion configuration" are interchangeable, and refers to a bioreactor system which is able to continuously feed cells disposed and cultured therein with fresh media while remove spent media. Typically, the fresh media is provided to the cells at the same rate as the spent media is removed. By continuously removing spent media and replacing it with new media, nutrient levels within the perfusion bioreactor are maintained for optimal growing conditions, while cell waste products are removed in order to avoid toxicity. According to some embodiments, system 100 is a bioreactor system 100, flow chamber 110 is a perfusion bioreactor, and bioreactor system 100 further comprises a filtering apparatus, said filtering apparatus is configured to filter the spent media exiting flow chamber 110, in order to separate waste products from secreted extracellular vesicles disposed within the medium. The waste products can be separated from bioreactor system 100 and be disposed of. The secreted extracellular vesicles can continue to circulate within the bioreactor system 100. Optionally, the secreted extracellular vesicles can be separated from bioreactor system 100, collected and maintained in an external apparatus or storing device.

According to some embodiments, flow chamber 110 is configured to allow indirect medium flow therethrough. According to some embodiments, flow chamber 110 is configured to allow indirect perfusion medium flow therethrough.

As used herein the terms "indirect medium flow" or "indirect flow" are interchangeable, and refers to a specific configuration of flow chamber 110, wherein the medium enters to the flow chamber 110 through the inlet port 111 and flows around and only partly through the at least one three-dimensional porous scaffold 120. As used herein the terms "indirect perfusion medium flow" or "indirect perfusion flow" are interchangeable, and refers to a perfusion flow chamber 110, wherein the medium enters to the perfusion flow chamber 110 through the inlet port 111 and flows around or through the at least one three-dimensional porous scaffold 120.

According to some embodiments, system 100 is configured to provide shear stress stimulations to the population of stem cells cultured on the at least one three-dimensional porous scaffold 120, wherein the population of stem cells secretes extracellular vesicles into the medium.

As used herein, the terms "shear stress" or "wall shear stress" are interchangeable, and refers to the tangential force per unit area that is exerted by the medium flow through the pores of the at least one three-dimensional porous scaffold 120 on the population of stem cells cultured thereon. According to some embodiments, the medium flow regime through the at least one three-dimensional porous scaffold 120 is laminar flow, and the medium is a Newtonian fluid.

According to some embodiments, direct medium flow through the at least one three-dimensional porous scaffold 120 generates enhanced shear stress stimulations directly to a population of stem cells adhered thereto, compared to indirect medium flow therethrough. According to some embodiments, the direct medium flow through the at least one three-dimensional porous scaffold 120 generates higher shear stress stimulations to the population of stem cells adhered thereto, than compared to the indirect medium flow therethrough. According to further embodiments, flow chamber 110 is adapted to accommodate within at least one three-dimensional porous scaffold 120 having a population of stem cells adhered thereto, and enable direct medium flow therethrough, thereby generating direct flow-induced shear stress stimulation onto the population of stem cells adhered therein.

As used herein, the term "flow-induced shear stress stimulation" refers to the shear stress stimulation generated by the flow of the medium through the at least one three-dimensional porous scaffold 120 having the population of stem cells adhered thereto.

As used herein, the term "direct flow-induced shear stress stimulation" refers to the shear stress stimulation generated by the direct flow of the medium through the at least one three-dimensional porous scaffold 120 having the population of stem cells adhered thereto.

According to some embodiments, the shear stress stimulations are generated by the movement of the at least one three-dimensional porous scaffold 120 having the population of stem cells cultured thereon, within the internal chamber 114. According to some embodiments, said movement of the at least one three-dimensional porous scaffold 120 disposed within the internal chamber 114 is selected from agitating, vibrating, rotating, waving, tilting, or any other form of movement of the at least one three-dimensional porous scaffold 120 within the internal chamber 114. Each possibility represents a separate embodiment of the present invention. According to some embodiments, the shear stress stimulations are generated by the movement of the at least one three-dimensional porous scaffold 120 within the internal chamber 114 while the medium flows therethrough.

According to some embodiments, the shear stress stimulation is generated by a combination of the direct and/or indirect flow of the medium through the at least one three-dimensional porous scaffold 120 and the movement of the at least one three-dimensional porous scaffold 120 within the internal chamber 114.

According to some embodiments, flow chamber 110 comprises a plurality of walls 113. According to some embodiments, flow chamber 110 has a curvilinear cross-sectional geometric shape or a rectilinear cross-sectional geometric shape, such as a circle, an ellipsoid, a square, a rectangle, a hexagon, an octagon, or any other suitable polygon thereof. Each possibility represents a separate embodiment of the present invention.

According to some embodiments, flow chamber 110 is substantially shaped as a cylinder. According to some embodiments, the at least one flow chamber wall 113 is substantially shaped as a cylinder, thereby forming a cylindric flow chamber wall. According to some embodiments, the cylindric flow chamber wall is positioned perpendicularly to first surface 111a and second surface 112a, and is extending from the first surface 111a to the second surface 112a. However, it is to be understood that flow chamber 110 fulfills the same function and maintains its operation when otherwise shaped, as a sphere, cube, ellipsoid, rectangle, triangular prism, or any other polyhedron. Each possibility represents a separate embodiment of the present invention. According to some embodiments, the cross-sectional shape of flow chamber 110 is circle-shaped. It is to be understood, however, that the cross-sectional geometry of flow chamber 110 may be of a different shape, such as a triangular, square, rectangle, elliptic, or any other curvilinear or rectilinear cross-section. Each possibility represents a separate embodiment of the present invention.

According to some embodiments, the at least one flow chamber wall 113 comprises at least three walls 113, wherein each one of the at least three walls 113 is in direct contact with the adjacent walls 113. According to some embodiments, each one of the at least three walls 113 are positioned perpendicularly to first surface 111a and second surface 112a, and are extending from the first surface 111a to the second surface 112a. According to some embodiments, the at least three walls 113 forms a triangular prism shape. According to some embodiments, the flow chamber 110 is substantially shaped as a triangular prism.

According to some embodiments, the at least one flow chamber wall 113 comprises at least four walls 113, wherein each one of the at least four walls 113 is in direct contact with the adjacent walls 113. According to some embodiments, each one of the at least four walls 113 are positioned perpendicularly to first surface 111a and second surface 112a, and are extending from the first surface 111a to the second surface 112a. According to some embodiments, the at least four walls 113 forms a cube or a rectangular cuboid shape. According to some embodiments, the flow chamber 110 is substantially shaped as a cube or a rectangular cuboid.

According to some embodiments, flow chamber 110 is made of a biocompatible material. According to some embodiments, flow chamber 110 is made of a polymer (plastic) or glass. According to further embodiments, the at least one flow chamber wall 113 is made of a biocompatible material. According to some embodiments, flow chamber 110 comprises at least one biocompatible material selected from a biocompatible polymer, such as but not limited to: polymethylmethacrylate (PMMA), polyethylmethacrylate, polybutylmethacrylate, poly-2-ethylhexylmethacrylate, polylaurylmethacrylate, polyhydroxylethyl methacrylate, poly-methylacrylate, 2-methacryloyloxyethylphosphorylcholine (MPC), polystyrene, poly n-ethyl-4-vinyl-pyridinium bromide, polyvinyl acetate, and derivatives and/or combinations thereof. Each possibility represents a separate embodiment of the present invention. According to some embodiments, flow chamber 110 comprises PMMA.

According to some embodiments, outlet port 112 is located at the at least one flow chamber wall 113, perpendicularly to the first surface 111 and the second surface 112 (not shown).

According to some embodiments, flow chamber 110 further comprises at least one scaffold holder (not shown), configured to hold the at least one three-dimensional porous scaffold 120 and enable direct and/or indirect medium flow therethrough, within internal chamber 114. According to some embodiments, the at least one scaffold holder holds or contains at least one three-dimensional porous scaffold 120. According to some embodiments, at least one three-dimensional porous scaffold 120 comprises a population of cultured stem cells. According to some embodiments, the population of cultured stem cells comprise a first type of stem cells. According to some embodiments, the at least one three-dimensional porous scaffold 120 is disposed within internal chamber 114.

According to some embodiments, the at least one three-dimensional porous scaffold 120 comprises a plurality of three-dimensional porous scaffolds 120. According to some embodiments, the at least one three-dimensional porous scaffold 120 comprises from about 1 to about 1 million of three-dimensional porous scaffolds 120. According to further embodiments, the at least one three-dimensional porous scaffold 120 comprises from about 1 to about 100, from about 100 to about 1,000, from about 1,000 to about 10,000, from about 10,000 to about 100,000, or from about 100,000 to about 1,000,000 of three-dimensional porous scaffolds 120. Each possibility represents a separate embodiment of the present invention.

According to some embodiments, flow chamber 110 further comprises a component, such as an electric or mechanical component or an actuator as presented herein, configured to enable the movement of the at least one scaffold holder within the flow chamber 110.

According to some embodiments, the at least one scaffold holder is configured to hold a plurality of three-dimensional porous scaffolds 120. According to some embodiments, flow chamber 110 further comprises a plurality of scaffold holders, configured to hold a corresponding plurality of three-dimensional porous scaffolds 120 and enable direct and/or indirect medium flow therethrough, within internal chamber 114. According to some embodiments, at least a portion of each one of the plurality of three-dimensional porous scaffolds 120 is positioned along the central vertical axis 102.

According to some embodiments, flow chamber 110 further comprises at least one additional holder, configured to hold at least one additional sample (not shown) within internal chamber 114. According to some embodiments, flow chamber 110 further comprises a plurality of additional holders, configured to hold a corresponding plurality of additional samples. According to some embodiments, the at least one additional sample comprises the at least one three-dimensional porous scaffold 120 comprising a population of cultured stem cells, wherein the population of cultured stem cells comprises the first type of stem cells. According to further embodiments, the population of cultured stem cells comprises a second type of stem cells. According to still further embodiments, the first type of stem cells is different from the second type of stem cells. According to some embodiments, the at least one additional sample comprises a two-dimensional (2D) porous scaffold comprising a population of cultured stem cells, wherein the population of cultured stem cells comprises at least one of the first type or the second type of stem cells. According to some embodiments, the at least one additional holder is configured to enable the insertion or the extraction of the at least one additional sample during medium flow within the internal chamber 114.

According to some embodiments, the at least one additional holder is positioned along the central vertical axis 102. According to some embodiments, at least a portion of the at least one additional holder is positioned along the central vertical axis 102, thereby enabling direct medium flow therethrough.

According to some embodiments, the at least one additional holder is positioned substantially in parallel to the at least one scaffold holder. According to some embodiments, the at least one additional holder is positioned substantially in parallel to the central vertical axis 102. According to further embodiments, the at least one additional holder is not positioned along the central vertical axis 102.

According to some embodiments, flow chamber 110 is configured to allow indirect medium flow through the at least one additional holder, so that medium enters to the flow chamber 110 through the inlet port 111 and flows around and only partly through the at least one additional holder.

According to some embodiments, system 100 further comprises at least one or more sensors for measuring in the medium at least one parameter selected from the group consisting of pressure, flow rate, temperature, pH, dissolved oxygen, concentration of medium components and extracellular vesicles quantity or concentration. Each possibility represents a separate embodiment of the present invention. According to some embodiments, system 100 further comprises one or more temperature-control elements for controlling the temperature within the flow chamber 110.

The concentration of extracellular vesicles within the medium can be calculated by the number of extracellular vesicles divided by the volume of the medium within a defined space, such as the volume of the medium reservoir 140, or the volume of a portion of the fluid communication appliance (such as a silicone tube). The concentration of extracellular vesicles within the medium can be also calculated by the number of extracellular vesicles divided by the cross-sectional area of a defined space, such as the fluid communication appliance.

According to some embodiments, system 100 further comprises a control unit in operative communication with the at least one or more sensors, configured to receive measurements of the at least one parameter and adjust the at least one parameter based on the measurements.

According to some embodiments, the control unit is further configured to map the flow pattern of the medium through at least one of: system 100, internal chamber 114, and the at least one three-dimensional porous scaffold 120, utilizing flow parameters such as flow rates and/or flow velocities. According to some embodiments, the control unit is further configured to perform three-dimensional models and/or simulations, according to the mapped flow pattern of the medium. According to some embodiments, the control unit is further configured to perform calculations based on the flow rates and/or flow velocities of the medium, in order to evaluate various parameters, such as shear stress stimulations. According to some embodiments, the control unit is further configured to compare the medium flow pattern between the at least one three-dimensional porous scaffold 120 having direct medium flow therethrough and the at least one additional sample.

According to some embodiments, the control unit is further configured to control the movement of the at least one scaffold holder and/or the at least one three-dimensional porous scaffold 120, within internal chamber 114. According to further embodiments, the control unit is configured to control the movement of the at least one three-dimensional porous scaffold 120 by controlling the activation of the electric component or the actuator, as disclosed herein above.

According to some embodiments, flow chamber 110 is a reactor. According to further embodiments, the reactor is a bioreactor. According to some embodiments, flow chamber 110 is selected from the group consisting of: laminar flow reactor (LFR), plug flow reactor (PFR), continuous stirred-tank reactor (CSTR), batch reactor, heterogenous catalytic reactor, fed-batch bioreactor, perfusion bioreactor, fix-bed bioreactor, packed bed bioreactor, wave bioreactor, air lift bioreactor, vibrating bed bioreactor and other known reactors in the art. Each possibility represents a separate embodiment. According to some embodiments, flow chamber 110 is a laminar flow bioreactor. According to some embodiments, flow chamber 110 is a perfusion bioreactor. According to some embodiments, flow chamber 110 is a perfusion bioreactor configured to allow direct perfusion medium flow therethrough. According to some embodiments, flow chamber 110 is a perfusion bioreactor configured to allow direct perfusion medium flow therethrough at a constant flow rate.

According to some embodiments, the medium is stirred within flow chamber 110. According to some embodiments, the medium flow directly through flow chamber 110. According to some embodiments, the medium flow in a pulse like manner through flow chamber 110. According to some embodiments, the medium is continuously circulating within system 100. According to some embodiments, the medium is continuously circulating within system 100 in an open loop perfusion configuration, wherein fresh medium enters flow chamber 110 and spent media is continuously removed for waste disposal and/or collection of secreted extracellular vesicles.

According to some embodiments, oxygenator 130 is configured to continuously provide oxygen to the medium. According to some embodiments, the medium is configured to enter oxygenator 130, undergo aeration, and depart therefrom. According to some embodiments, the medium comprises dissolved oxygen following its department from the oxygenator 130. According to some embodiments, oxygenator 130 is configured to continuously provide oxygen to the medium through aeration. According to some embodiments, oxygenator 130 is configured to continuously provide oxygen to the population of cultured stem cells adhered to the at least one three-dimensional porous scaffold 120 disposed within internal chamber 114. According to some embodiments, oxygenator 130 is configured to continuously provide oxygen to a multi-layer expansion of the stem cells adhered to the at least one three-dimensional porous scaffold 120 disposed within internal chamber 114. According to some embodiments, oxygenator 130 is configured to continuously provide oxygen to a three-dimensional multi-layer structure of stem cells adhered to the at least one three-dimensional porous scaffold 120 disposed within internal chamber 114. Oxygenator 130 can be selected from any known oxygenator in the art.

According to some embodiments, oxygenator 130 is an integral part of flow chamber 110. According to some embodiments, oxygenator 130 is disposed within flow chamber 110. According to some embodiments, oxygenator 130 is an integral part of medium reservoir 140. According to some embodiments, oxygenator 130 is disposed within medium reservoir 140. According to some embodiments, oxygenator 130 and flow chamber 110 are disposed within medium reservoir 140.

According to some embodiments, medium reservoir 140 is configured to receive and/or contain a medium therein. According to some embodiments, the medium comprises a growth medium or culture medium, configured to support the growth of cells and microorganisms, such as stem cells. According to some embodiments, the medium comprises at least one material selected from the group consisting of: water, salts, nutrients, minerals, vitamins, amino acids, nucleic acids, proteins (such as cytokines and growth factors), hormones, serum or any combination thereof. According to some embodiments, the medium as used herein refers to a liquid substance which is required for cell proliferation and is capable of maintaining stem cells in an undifferentiated state and promote their growth and expansion.

According to some embodiments, medium reservoir 140 is made of a material comprising a polymer and/or glass. Appropriate polymers (plastics) include, but not limited to, Poly(methyl methacrylate), polycarbonates, ethylene-vinyl acetate polymer, polystyrene sulfonate, polystyrene, polypropylene, polyethylene, and combinations thereof. According to some embodiments, medium reservoir 140 is made of glass.

According to some embodiments, pump 150 comprises one or more peristaltic pumps. According to some embodiments, pump 150 is selected from a peristaltic pump, syringe pump, diaphragm pump, or any other known pump in the art. Each possibility represents a separate embodiment of the present invention. According to some embodiments, pump 150 is configured to delivers the medium into flow chamber 110 at a predetermined flow rate, through the inlet port 111. According to some embodiments, pump 150 is in operative communication with the control unit which controls and adjusts the flow rate of the medium into the flow chamber 110, in order to provide the predetermined flow rate therein. According to some embodiments, the flow rate is further adjusted according to the secretion properties of extracellular vesicles (such as but not limited to, rate or quantity) from the population of stem cells on at least one three-dimensional porous scaffold 120. According to some embodiments, pump 150 is configured to control the flow of medium from the medium reservoir 140 into the flow chamber 110, based on the predetermined flow rate through the inlet port 111, or optionally the liquid level inside the internal chamber 114.

Reference is now made to FIG. 1B showing a flowchart of a method 200 for producing extracellular vesicles from stem cells, according to some embodiments of the present invention.

According to some embodiments, the present invention provides method 200 for producing extracellular vesicles from stem cells, the method comprises step 202 of providing the system 100 as presented herein above, wherein the system 100 is configured to deliver a medium through a population of cultured stem cells.

According to some embodiments, step 202 further comprise placing the at least one three-dimensional porous scaffold 120 within the internal chamber 114 of flow chamber 110. According to some embodiments, step 202 comprises placing a plurality of three-dimensional porous scaffolds 120 within the internal chamber 114 of flow chamber 110. According to some embodiments, step 202 comprises placing the at least one three-dimensional porous scaffold 120 within the at least one scaffold holder.

According to some embodiments, the method further comprises step 204 of seeding and culturing a population of stem cells on at least one three-dimensional porous scaffold 120.

As used herein, the term "scaffold" refers to a three-dimensional structure comprising a material that provides a surface suitable for adherence/attachment and proliferation of stem cells. A scaffold may further provide mechanical stability and support. A scaffold may be in a particular shape or form so as to influence or delimit a three-dimensional shape or form assumed by a population of proliferating stem cells. According to some embodiments of the present invention, the scaffold is a three-dimensional porous substrate made from a material approved by a health authority, for human use.

According to some embodiments, at least one three-dimensional porous scaffold 120 comprises a plurality of three-dimensional porous scaffolds 120, each having a population of stem cells cultured therein. According to some embodiments, at least one three-dimensional porous scaffold 120 comprises at least one material selected from the group consisting of: polyester, polypropylene, polylactic acid (PLA), Poly-L-lactic acid (PLLA), poly(lactic-co-glycolic acid) (PLGA), polycaprolactone (PCL), cellulose, silk, glass, hydrogels and combinations and variations thereof. Each possibility represents a separate embodiment of the present invention. According to some embodiments, the hydrogels are natural and synthetic hydrogels, selected from: gelatin, collagen, fibrin, PEG, alginate, chitosan, and other hydrogels known in the art. Each possibility represents a separate embodiment of the present invention. According to some embodiments, the at least one three-dimensional porous scaffold 120 is comprises extruded, printed, leached or electro spun scaffolds, wherein said scaffolds comprise the materials presented herein.

According to some embodiments, the at least one three-dimensional porous scaffold 120 comprises polyester nonwoven fibers and polypropylene. According to further embodiments, at least one three-dimensional porous scaffold 120 comprises a 50/50 mixture by volume of polyester non-woven fibers and polypropylene. According to some embodiments, the at least one three-dimensional porous scaffold 120 comprises Fibra-Cel®.

According to some embodiments, the at least one three-dimensional porous scaffold 120 is in a shape selected from the group consisting of a disc, a square, a cylinder, a sphere, or any other polyhedron. Each possibility represents a separate embodiment of the present invention. According to some embodiments, the at least one three-dimensional porous scaffold 120 has at least one dimension (e.g. diameter, length, height, etc.) having a length selected from a range of about 1 μm to about 500 mm. According to some embodiments, the length of the at least one dimension is selected from the range of about 1 μm to about 100 μm, about 100 μm to about 5 mm, about 5 mm to about 100 mm, or about 100 mm to about 500 mm. Each possibility represents a separate embodiment of the present invention. According to some embodiments, the length of the at least one dimension is selected from the range of about 5 μm to about 50 μm. According to some embodiments, the at least one three-dimensional porous scaffold 120 has a diameter selected from a range of about 5 μm to about 50 μm. According to some embodiments, the diameter of the at least one three-dimensional porous scaffold 120 is about 15 μm. According to some embodiments, the at least one three-dimensional porous scaffold 120 has a height selected from the range of about 100 μm to about 500 mm.

According to some embodiments, the stem cells are human stem cells. According to some embodiments, the stem cells are naïve or engineered stem cells. According to some embodiments, the stem cells are naïve or engineered human stem cells. According to some embodiments, the stem cells are selected from the group consisting of: adult stem cells, embryonic stem cells (ESCs), induced pluripotent stem cells, cord blood stem cells and amniotic fluid stem cells. Each possibility represents a separate embodiment of the present invention. According to some embodiments, the adult stem cells are selected from the group consisting of: neural stem cells, skin stem cells, epithelial stem cells, skeleton muscle satellite cells, mesenchymal stem cells, adipose-derived stem cells, endothelial stem cells, dental pulp stem cells, hematopoietic stem cells (including bone marrow stem cells, bone marrow mesenchymal stem cells, and the like) and placenta derived stem cells (including placenta derived mesenchymal stem cells, and the like). Each possibility represents a separate embodiment of the present invention. According to some embodiments, the adult stem cells are dental pulp stem cells (DPSCs). According to some embodiments, the adult stem cells are adipose-derived stem cells.

According to some embodiments, the stem cells are naïve cells. According to other embodiments, the stem cells are engineered step cells, namely their genome is edited. According to some embodiments, the stem cells are engineered by modifying, adding or deleting at least one polynucleotide sequence. Any method known in the art for editing a polynucleotide sequence may be used according to the present invention for production of engineered stem cells, including but not limited to CRISPR (clustered regularly interspaced short palindromic repeats) technology. According to some embodiments, the engineered stem cells are transfected with a viral vector. According to some embodiments, at least one polynucleotide sequence of the stem cells is edited by upregulating or downregulating genes. According to some embodiments, at least one gene, encoded for a stem cells cargo, is edited by upregulating or downregulating at least one gene-product. According to some embodiments, the upregulated or downregulated gene encodes a protein. According to some embodiments, the protein is a membrane-based protein. According to some embodiments, the protein is a lipoprotein or a phosphoprotein.

According to some embodiments, step 204 of culturing a population of stem cells on at least one three-dimensional porous scaffold 120 is performed on at least one three-dimensional porous scaffold 120 within system 100. According to further embodiments, step 204 of culturing a population of stem cells on at least one three-dimensional porous scaffold 120 is performed within the internal chamber 114.

According to some embodiments, step 204 of culturing a population of stem cells on at least one three-dimensional porous scaffold 120 is performed on at least one three-dimensional porous scaffold 120 outside of system 100. According to further such embodiments, step 204 of culturing a population of stem cells on at least one three-dimensional porous scaffold 120 is performed on at least one three-dimensional porous scaffold 120 wherein said at least one three-dimensional porous scaffold 120 is located outside of internal chamber 114.

According to some embodiments, step 204 comprise: providing a certain amount of stem cells, and seeding them on to the at least one three-dimensional porous scaffold 120, thereby adhering them thereto. According to some embodiments, the certain amount of stem cells is in the range of about 0.001 to about 10 million stem cells per a total surface area of 1200 cm$^2$ of the at least one three-dimensional porous scaffold 120. According to further embodiments, the certain amount is in the range of about 0.05 to about 0.4 million stem cells per total a surface area of 1200 cm$^2$ of the at least one three-dimensional porous scaffold 120. According to still further embodiments, the certain amount is about 0.1 million stem cells per a total surface area of 1200 cm$^2$ of the at least one three-dimensional porous scaffold 120.

According to some embodiments, step 204 further comprises providing conditions for multi-layer expansion of the stem cells within system 100, wherein at least one three-dimensional porous scaffold 120 is already located inside internal chamber 114. According to further such embodiments, step 204 further comprises providing conditions for multi-layer expansion of the stem cells within the flow chamber 110.

According to some other embodiments, step 204 further comprises providing conditions for multi-layer expansion of the stem cells outside of the system 100 and/or internal chamber 114, wherein at least one three-dimensional porous scaffold 120 is located outside of internal chamber 114 and/or system 100. According to further such embodiments, said conditions for multi-layer expansion of the stem cells are provided outside of the system 100 and/or internal chamber 114, prior to the insertion of said at least one three-dimensional porous scaffold 120 thereto.

According to some embodiments, the multi-layer expansion is in the form of a three-dimensional multi-layer structure of stem cells, wherein the stem cells adhere to the scaffold 120 and/or to each other to form connected stem cells multi-layers. According to some embodiments, the conditions for multi-layer expansion of the stem cells result in achieving optimal stem cell density cultured on the at least one three-dimensional porous scaffold 120. According to some embodiments, the three-dimensional multi-layer structure of stem cells comprises optimal cell density configured for enhanced production of extracellular vesicles.

According to some embodiments, the conditions for multi-layer expansion of the stem cells comprises applying zero or low shear stress conditions during the seeding and cultivation of the population of stem cells on at least one three-dimensional porous scaffold 120, for a time duration selected from 1 to 30 days. According to further embodiments, the time duration is selected from 4 to 10 days. According to some embodiments, the conditions for multi-layer expansion of the stem cells comprises providing the stem cell with a temperature in the range of about 36 to about 38° C. According to further embodiments, the temperature is about 37° C. According to some embodiments, the conditions for multi-layer expansion of the stem cells comprises providing the stem cells with a humidity in the range of about 80% to about 95%. According to further embodiments, the humidity is about 90%. According to some embodiments, the conditions for multi-layer expansion of the stem cells comprises providing the stem cell with a dissolved oxygen (DO) content of about 20% to about 90%. According to further embodiments, the DO is about 70%. According to some embodiments, the conditions for multi-layer expansion of the stem cells comprises providing the stem cell a pH selected from the range of about 7 to about 7.6. According to further embodiments, the pH is about 7.3.

According to some embodiments, the conditions for multi-layer expansion of the stem cells at step 204 comprises providing the stem cell with at least one of: a temperature in the range of about 36 to about 38° C., a humidity in the range of about 80% to about 95%, a dissolved oxygen (DO) content of about 20% to about 90%, a pH selected from the range of about 7 to about 7.6, applying zero or low shear stress conditions during the seeding and cultivation of the population of stem cells on at least one three-dimensional porous scaffold 120, and combinations thereof. Each possibility represents a separate embodiment of the present invention.

According to some embodiments, the method further comprises step 206 of providing shear stress stimulations to the population of stem cells cultured on the at least one three-dimensional porous scaffold 120, wherein the population of stem cells secretes extracellular vesicles into the medium. According to some embodiments, the shear stress stimulations significantly enhances the production and/or secretion of extracellular vesicles from the multi-layer expansion of the stem cells into the medium.

According to some embodiments, if step 204 was performed outside of system 100 and/or internal chamber 114, step 206 initially comprises placing the at least one three-dimensional porous scaffold 120 within the internal chamber 114 of flow chamber 110, prior to providing shear stress stimulations to the population of stem cells cultured on the at least one three-dimensional porous scaffold 120. According to some embodiments, the at least one three-dimensional porous scaffold 120 is placed perpendicularly to the flow direction 101 within the internal chamber 114. According to some embodiments, the at least one three-dimensional porous scaffold 120 is placed in parallel to the flow direction 101 within the internal chamber 114. It is contemplated that the placement form of the at least one three-dimensional porous scaffold 120 within internal chamber 114 can affect the direct flow-induced shear stress stimulation to the population of stem cells.

According to some embodiments, step 206 of providing shear stress stimulations to the population of stem cells cultured on the at least one three-dimensional porous scaffold 120 is performed by flowing the medium into the flow chamber 110. According to some embodiments, the medium enters the flow chamber 110 through the inlet port 111 at a predetermined flow rate, flows through the at least one three-dimensional porous scaffold 120, and exits through the outlet port 112. According to some embodiments, the predetermined flow rate is adjusted to provide a direct flow-induced shear stress stimulation to the population of stem cells, wherein the population of stem cells secretes extracellular vesicles into the medium.

According to some embodiments, step 206 of providing shear stress stimulations to the population of stem cells cultured on the at least one three-dimensional porous scaffold 120 is performed by moving the at least one three-dimensional porous scaffold 120 within the flow chamber 114. According to some embodiments, the movement of the at least one three-dimensional porous scaffold 120 is configured to provide shear stress stimulation to the population of stem cells, wherein the population of stem cells secretes extracellular vesicles into the medium. According to some embodiments, the movement of the at least one three-dimensional porous scaffold 120 is selected from agitating, vibrating, rotating, waving, tilting, or any other form of movement thereof. According to some embodiments, during the movement of the at least one three-dimensional porous scaffold 120, the medium flows through the at least one three-dimensional porous scaffold 120 at a low flow rate adapted to provide zero or low shear stress conditions. According to some embodiments, during the movement of the at least one three-dimensional porous scaffold 120, the medium flows through the at least one three-dimensional porous scaffold 120 at the predetermined flow rate.

According to some embodiments, the extracellular vesicles secreted form the stem cells are selected from the group consisting of: exosomes, microvesicles, apoptotic bodies and ectosomes. Each possibility represents a separate embodiment of the present invention.

As used herein, the term "exosomes" refers to membrane bound extracellular vesicles (EVs) that are produced in the endosomal compartment of most eukaryotic cells and later secreted from the cells. The exosomes typically contain various molecular components from the stem cells (also denoted "cargo" or "exosomal cargo"), that might include some or all of: proteins, lipids, mitochondrial components and genetic materials such as: RNA and DNA, and combinations thereof. According to some embodiments, the exosomal cargo comprises at least one protein. According to some embodiments, the exosomal cargo comprises at least one phospholipid or protein. According to some embodiments, the phospholipid is a membrane phospholipid. According to some embodiments, the protein is a membrane-based protein or a lipoprotein.

According to some embodiments, the extracellular vesicles comprises at least one protein secreted from engineered stem cells. According to some embodiments, the extracellular vesicles are exosomes. According to some embodiments, the exosomes comprises at least one protein secreted from engineered stem cells. According to some embodiments, the extracellular vesicles are exosomes secreted from a population of stem cells selected from the group consisting of dental pulp stem cells (DPSCs) and adipose-derived stem cells.

According to some embodiments, the predetermined flow rate of step 206 is in the range of about 0.01 to about 100 ml/min. According to some embodiments, the predetermined flow rate is in the range of about 0.01 to about 0.1 ml/min, about 0.1 to about 1 ml/min, about 1 to about 10 ml/min, or about 10 to about 100 ml/min. Each possibility represents a separate embodiment of the present invention.

According to some embodiments, the predetermined flow rate in the range of about 0.1 to about 10 ml/min. According to some embodiments, the predetermined flow rate in the range of about 0.1 to about 1 ml/min. According to some embodiments, the predetermined flow rate in the range of about 0.5 to about 1.5 ml/min.

According to some embodiments, the medium flows through the at least one three-dimensional porous scaffold 120 at a flow velocity in the range of about 0.1 to about 100 cm/min. According to some embodiments, the medium flows through the at least one three-dimensional porous scaffold 120 at a flow velocity in the range of about 0.1 to about 1 cm/min, about 1 to about 10 cm/min, or about 10 to about 100 cm/min. Each possibility represents a separate embodiment of the present invention. According to some embodiments, the flow velocity in the range of about 0.1 to about 5 cm/min. It is contemplated that the flow velocity of the medium through the at least one three-dimensional porous scaffold 120 is dependent on the dimensions of the at least one three-dimensional porous scaffold 120, and the predetermined flow rate.

According to some embodiments, the shear stress stimulations provided to the population of stem cells are in the range of about 0.5 to about 100 Dyne/cm$^2$. According to some embodiments, the shear stress stimulations provided to the population of stem cells are above about 0.5 dyne/cm$^2$. According to some embodiments, the shear stress stimulation provided to the population of stem cells is in the range of about 5 to about 100 Dyne/cm$^2$. According to some embodiments, the shear stress stimulation is in the range of: about 0.5 to about 5 Dyne/cm$^2$, about 5 to about 30 Dyne/cm$^2$, about 30 to about 70 Dyne/cm$^2$, or about 70 to about 100 Dyne/cm$^2$. Each possibility represents a separate embodiment of the present invention. According to some embodiments, the shear stress stimulation is in the range of about 5 to about 70 Dyne/cm$^2$. According to some embodiments, the shear stress stimulation is in the range of about 5 to about 50 Dyne/cm$^2$. According to some embodiments, the shear stress stimulation is in the range of about 5 to about 30 Dyne/cm$^2$. According to some embodiments, the shear stress stimulation is in the range of about 15 to about 30 Dyne/cm$^2$.

Surprisingly, the present inventors have discovered that by providing shear stress stimulations at values of above about 0.5 Dyne/cm$^2$ to the population of stem cells adhered to the three-dimensional porous scaffold 120, the extracellular vesicles production and/or secretion therefrom into the medium can be significantly enhanced. It was previously reported in perfusion bioreactor systems adapted for the secretion of extracellular cells that when shear stress exceeds 0.1 Dyne/cm$^2$, cell growth slows or cells die, and therefore the number of extracellular vesicles decreases and their resulting quality will be poor (Korean Pub. No. 20190010490). Therefore, the shear stress stimulations provided herein were found to provide unexpected and highly beneficial results, namely enhanced extracellular vesicles production and/or secretion.

According to some embodiments, step 206 further comprises stirring the medium within the flow chamber 110, thereby repetitively flowing the medium through the at least one three-dimensional porous scaffold 120.

According to some embodiments, step 206 further comprises continuously circulating the medium within system 100 in the direction of flow direction 101 of FIG. 1A. According to some embodiments, step 206 further comprises continuously circulating the medium within system 100, in an open loop perfusion configuration, as was presented herein above. According to some embodiments, the medium is circulated within system 100 for about 1 hour to about 50 days. According to some embodiments, the medium is circulated within system 100 for about 1 hour to about 24 hours, for about 1 day to about 5 days, for about 5 days to about 15 days, for about 15 days to about 30 days, or for about 30 days to about 50 days. Each possibility represents a separate embodiment of the present invention. According to some embodiments, the medium is circulated within system 100 for about 1 hour to about 30 days. According to further embodiments, the medium is circulated within system 100 for about 1 hour to about 72 hours. According to still further embodiments, the medium is circulated within system 100 for about 48 hours.

According to some embodiments, step 206 is performed for from about 1 hour to about 50 days. According to further embodiments, step 206 is performed for from about 1 hour to about 24 hours, from for about 1 day to about 5 days, for about 5 days to about 15 days, for about 15 days to about 30 days, or for about 30 days to about 50 days. Each possibility represents a separate embodiment of the present invention. According to further embodiments, step 206 is performed for about 1 hour to about 30 days. According to further embodiments, step 206 is performed for about 1 hour to about 72 hours. According to still further embodiments, step 206 is performed for about 48 hours.

According to some embodiments, the medium is intermittently circulated within system 100, thereby flowing through the at least one three-dimensional porous scaffold 120 at a pulse-like manner.

Advantageously, the present inventors have discovered that by providing a three-dimensional multi-layer structure of stem cells adhered to the three-dimensional porous scaffold 120, to system 100 and inducing direct flow shear stress stimulation therethrough (for example, in the form of a predetermined flow rate or the movement of the three-dimensional porous scaffold 120), the extracellular vesicles production and/or secretion therefrom into the medium can be significantly enhanced.

According to some embodiments, flow chamber 110 is configured to support the at least one three-dimensional porous scaffold 120 having a multi-layer structure of stem cells adhered therein. According to some embodiments, flow chamber 110 is not a hollow fiber bioreactor (HFBR), and system 100 does not comprise a hollow fiber bioreactor. It is contemplated that for the purpose of utilizing the method of the present invention as presented herein, the flow chamber 110 is configured to permit three-dimensional flow therethrough, in order to induce shear stress stimulations through the multi-layer structure of stem cells. Hollow fiber bioreactors are not suitable for the present method as disclosed herein, since cells cultured in HFBR systems typically demonstrate monolayer two-dimensional (2D) structures, and therefore are not suitable to support the three-dimensional multi-layer structure of stem cells resulting in enhanced production and/or secretion of extracellular vesicles, as disclosed herein (Ku, Kuo et al. "Development of a hollow-fiber system for large-scale culture of mammalian cells." Biotechnology and Bioengineering vol. 23, no. 1, pp. 79-95, 1981).

According to some embodiments, the method further comprises step 208 of collecting the medium exiting flow chamber 110.

According to some embodiments, the method further comprises step 210 of isolating the secreted extracellular vesicles dispersed within the medium. Any method known in the art for collecting EVs from a medium may be used according to the present invention. According to some embodiments, the method of isolating the EVs from the medium is selected from the group consisting of: Ultracentrifugation (UC), Density gradient UC, Ultrafiltration (UF), Tangential Flow Filtration (TFF), Hydrostatic dialysis, Precipitation kits/polymer (PEG or others), Size Exclusion Chromatography (SEC), Affinity Chromatography, Immuno-isolation (FACS, MACS), Microfluidic Devices, and combinations thereof. Each possibility represents a separate embodiment of the present invention.

According to some embodiments, the secreted extracellular vesicles are isolated utilizing a differential centrifugation procedure including Ultracentrifugation (UC).

According to some embodiments, the combination of three-dimensional porous scaffold 120 with multi-layered expansion of stem cells within the system 100 as presented herein while inducing direct flow shear stress stimulations therethrough result not only in enhanced production of exosomes but also in morphological changes of the stem cells and in improved properties of the exosomes secreted, e.g. improved pro-angiogenic and pro-neurogenic effect.

EVs produced by the above methods and systems as well as compositions comprising at least one exosome produced by said methods and systems, are also within the scope of the present invention. According to some embodiments, the EVs comprise at least one component selected from the group consisting of: proteins, polypeptides, peptides, amino acids, lipids, mitochondrial components and polynucleotide sequences. According to some embodiments, the extracellular vesicles comprise a genetic material such as RNA and DNA. According to some embodiments, the extracellular vesicles comprise at least one engineered genetic material. According to some embodiments, the extracellular vesicles comprise at least one protein. According to some embodiments, the extracellular vesicles comprise at least one protein produced by stem cells engineered to produce said protein. According to some embodiments, the extracellular vesicles comprise at least one phospholipid. According to some embodiments, the phospholipid is a membrane phospholipid. According to some embodiments, the protein is a membrane-based protein or a lipoprotein.

According to some embodiments, the EVs produced by the above methods and systems carry at least one marker selected from CD9, CD63, and CD81. According to some embodiments, the EVs produced by the above methods and systems carry the markers CD9, CD63, and CD81.

According to yet other embodiments, the EVs produced by the above methods and systems comprises at least one upregulated protein which selected from the group consisting of: proteins related to mechanical stimuli response, e.g. Rho; proteins related to mechanical transduction machinery and cell response (such as integrin, cadherin, cytoskeleton remodeling), including: RhoG (Rho-related GTP-binding protein RhoG), CAPZA2 (F-actin-capping protein subunit alpha-2), ITGAV (Integrin alpha-V; Integrin alpha-V heavy chain; Integrin alpha-V light chain), CKAP5 (Cytoskeleton-associated protein 5); CDH13 (Cadherin-13), ARPC2 (Actin-related protein 2/3 complex subunit 2), ARPC4 (Actin-related protein 2/3 complex subunit 4), MYH11 (Myosin-11), TUBA1B (Tubulin alpha-1B chain), TUBB, TUBB2B, and TUBB2A (Tubulin beta chain; Tubulin beta-2B chain; Tubulin beta-2A chain).

The present invention provides according to yet another aspect, a population of EVs characterized by at least one marker selected from CD9, CD63, and CD81 and by carrying at least one protein which is upregulated compared to EVs produced by other methods.

According to some embodiments, the upregulated protein are selected from the group consisting of: Rho, RhoG (Rho-related GTP-binding protein), CAPZA2 (F-actin-capping protein subunit alpha-2), ITGAV (Integrin alpha-V, Integrin alpha-V heavy chain, Integrin alpha-V light chain), CKAP5 (Cytoskeleton-associated protein 5); CDH13 (Cadherin-13), ARPC2 (Actin-related protein 2/3 complex subunit 2), ARPC4 (Actin-related protein 2/3 complex subunit 4), MYH11 (Myosin-11), TUBA1B (Tubulin alpha-1B chain), TUBB, TUBB2B, and TUBB2A (Tubulin beta chain, Tubulin beta-2B chain, Tubulin beta-2A chain).

According to some embodiments, the EVs comprises a plurality of upregulated proteins.

Pharmaceutical compositions comprising the EVs characterized by the above markers and upregulated protein cargo are also within the scope of the present application as well as methods of preventing or treating a disease or disorder using them.

According to some embodiments, the EVs produced by the above methods and systems, characterized by the above markers and upregulated protein cargo, could be utilized for the treatment of nerve injuries, such as peripheral neuropathy, spinal cord injuries, stroke, and the like.

According to some embodiments, said EVs may be used for any application known in the art for exosomes, including but not limited to diagnostics, preventive and therapeutic applications such as tissue remodeling, tissue repair or tissue regeneration, neural disease treatment, diabetic and ischemic disease treatment, cardiovascular disease treatment, psychiatric disease treatment, vaccines, cancer treatment, immune disorders treatment, wound healing, and cosmetic applications. Each possibility represents a separate embodiment of the present invention.

According to some embodiments, a composition comprising EVs produced by the above methods and systems is also within the scope of the present invention. According to some embodiments, a pharmaceutical composition or a cosmetic composition comprising said EVs produced by the above methods and systems is also within the scope of the present invention.

Any disease or disorder eligible for diagnostics, prevention or treatment with stem cells may be treated or prevented with a composition comprising EVs produced by the above methods and systems, according to the present invention.

According to some embodiments, a disease or disorder eligible for prevention or treatment with compositions comprising EVs produced by the methods of the present invention is selected from the group consisting of: inflammatory diseases; autoimmune diseases; blood vessel diseases; cardiac diseases; respiratory system diseases; skeletal system diseases; gastrointestinal tract diseases; kidney disease; urinary tract diseases; skin diseases; ageing associated diseases; peripheral nerve and skeletal muscle diseases; diseases of the central nervous system; eye diseases; diseases of the endocrine system; cancer diseases; diabetes; and dental and oral diseases. Each possibility represents a separate embodiment of the present invention.

Methods of preventing or treating a disease or disorder comprising administering a composition comprising EVs produced according to the present invention are also included.

The EVs of the present invention and the compositions comprising them, may be administered using any method known in the art, including but not limited to parenteral, enteral and topical routes.

The term "plurality", as used herein, means more than one.

The term "about", as used herein, when referring to a measurable value such as an amount, a temporal duration, and the like, is meant to encompass variations of +/−10%, more preferably +/−5%, even more preferably +/−1%, and still more preferably +/−0.1% from the specified value, as such variations are appropriate to the disclosed devices, systems and/or methods.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. No feature described in the context of an embodiment is to be considered an essential feature of that embodiment, unless explicitly specified as such.

Although the invention is described in conjunction with specific embodiments thereof, it is evident that numerous alternatives, modifications and variations that are apparent to those skilled in the art may exist. It is to be understood that the invention is not necessarily limited in its application to the details of construction and the arrangement of the components and/or methods set forth herein. Other embodiments may be practiced, and an embodiment may be carried out in various ways. Accordingly, the invention embraces all such alternatives, modifications and variations that fall within the scope of the appended claims.

EXAMPLES

Example 1—3D Cell Seeding and Proliferation

The following stem cells were used in the examples: Human dental pulp stem cells (DPSCs), passages 7-9 (Lonza, Cat: PT-5025) and adipose-derived mesenchymal stem cells (Lonza). Additionally, primary neurons from dorsal root ganglia (DRG) from adult female Sprague-dawley rats (200-220 gram) were isolated and plated on laminin-coated plates, as described previously (Guo, S., et al., Intranasal Delivery of Mesenchymal Stem Cell Derived Exosomes Loaded with Phosphatase and Tensin Homolog siRNA Repairs Complete Spinal Cord Injury. ACS Nano 2019, 13, 10015-10028).

For culturing DPSCs in a 3D environment, Fibra-Cel scaffolds (Eppendorf), composed of 50% polyester fibers (15 µm diameter) and 50% polypropylene were used.

For testing the effect of extracellular vesicles (EVs) on vasculature, porous sponges composed of 50% PLLA (Polysciences) and 50% PLGA (Boehringer Ingelheim) were fabricated utilizing a salt-leaching technique to achieve pore sizes of 212-600 µm and 93% porosity (A. Lesman, J. Koffler, R. Atlas, Y. J. Blinder, Z. Kam, and S. Levenberg, "Engineering vessel-like networks within multicellular fibrin-based constructs," Biomaterials, vol. 32, no. 31, pp. 7856-7869 November 2011).

In order to optimize 3D cell seeding density to reach a steady state and to expand in multi-layers, a series of DPSCs (0.05, 0.1, 0.2 or 0.4 million stem cells per a total surface area of 1200 $cm^2$ of the at least one three-dimensional porous scaffold, n=4/group) were seeded into Fibra-Cel scaffolds. Cell proliferation at days 3, 6, 9, 13 post-seeding was assessed using Alamar Blue assay: 1 ml medium composed of 10% alamar blue and 90% DPSC medium was added to the scaffold on 24-well plate. After 3h incubation on an orbital shaker, 100 µl medium from each well was collected to a 96-well plate, with three replicates per scaffold. A fluorescence signal was measured using the plate-reader at Ex 555 nm and Em 585 nm.

Figure 2:
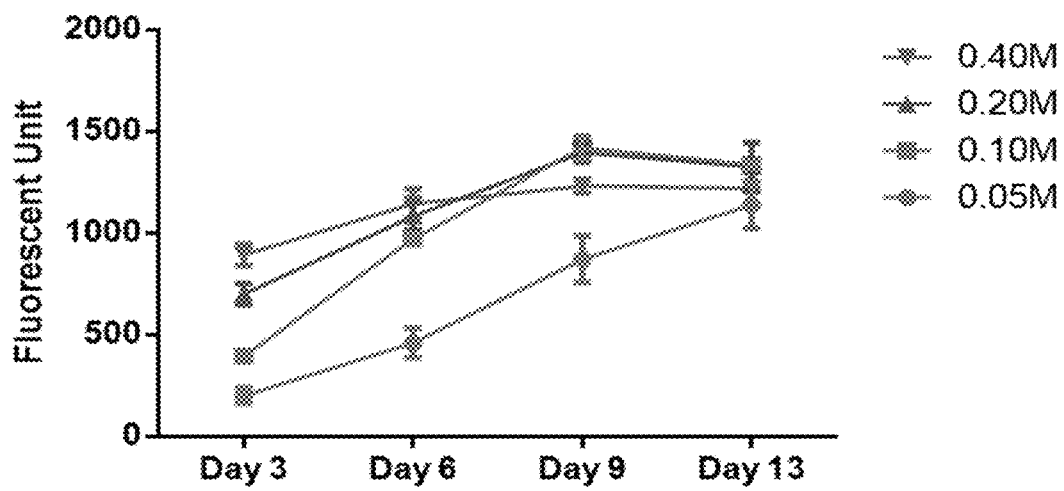
FIG. 2 is a graph illustrating the effect of seeding different cell densities of DPSCs (0.05, 0.1 0.2, and 0.4 million stem cells per a total surface area of 1200 cm$^2$ of at least one three-dimensional porous scaffold) on 3D porous scaffolds, on proliferation of the cells, as depicted by fluorescence vs. incubation time (days), as measured in an Alamar Blue assay.

The results depicted at FIG. 2 led to selection of the protocol of seeding 0.1 million cells on the Fibra-Cel scaffold, and incubating them for 9 days to reach multi-layer expansion, for the following flow-rate experiments.

Example 2—Cell Number Quantification and Flow Rates Experiment Protocol

3D DPSC-seeded scaffolds with optimized seeding density and multi-layered expansion and incubation period (9-day static cultivation) were randomly assigned and assembled to a bioreactor system (B. Zohar, Y. Blinder, D. J. Mooney, and S. Levenberg, "Flow-Induced Vascular Network Formation and Maturation in Three-Dimensional Engineered Tissue," ACS Biomater. Sci. Eng., vol. 4, no. 4, pp. 1265-1271 April 2018) with an exosome-depleted medium. The exosome-depleted medium contained: low-glucose Dulbecco's Modified Eagle Medium (Biological Industries), supplemented with 10% exosome-depleted fetal bovine serum (Hyclone) which previously went through ultracentrifugation to remove exosome content from the serum; 1% Glutamax (Gibco); 1% Penicillin-streptomycin-nystatin (Biological Industries); and 1% non-essential amino acid (Gibco). The bioreactor was connected with a peristaltic pump (both of EBERS Medical Technology SL) and a medium chamber, as illustrated at FIG. 1A.

Flow rates experiments were conducted by flowing the EVs-depleted medium through the DPSC-seeded scaffolds within the bioreactor at different flow rates. Three different medium flow rates were tested: 0.1, 0.5 and 1.0 ml/min. Two control samples were additionally tested: a 3D static control sample in which cells were cultivated on Fibra-Cel scaffolds under no shear stress conditions; and a 2D control sample in which cells were cultivated on a two-dimensional plastic (T-150 flask, made by TPP) under no shear stress conditions.

The experimental groups included: 1) 0.1 ml/min flow rate; 2) 0.5 ml/min flow rate; 3) 1.0 ml/min flow rate; 4) 3D static control; and 5) 2D control (without scaffolds).

After two days of flowing and continuously circulating the medium through the scaffolds, the medium was collected for EVs isolation.

EVs isolation was performed using a differential centrifugation protocol described in C. Thery, S. Amigorena, G. Raposo, and A. Clayton, "Isolation and characterization of EVs from cell culture supernatants and biological fluids," Curr. Protoc. cell Biol., vol. Chapter 3, p. Unit 3.22, April 2006. Briefly, the differential centrifugation protocol includes: pre-centrifugations for excluding cell/cell debris and apoptotic bodies (First: 300 g, 10 min; Second 2000 g, 10 min; third 10000 g, 30 min) followed by two ultracentrifugation runs (100000 g, 70 min). The EV pellets were re-suspended in 20 0µl sterile DPBS.

Figure 3:
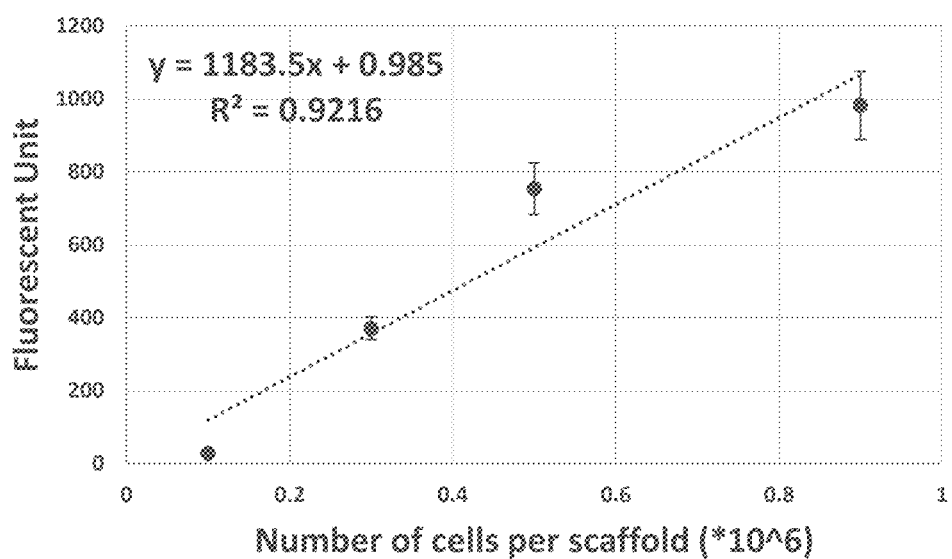
FIG. 3 represents the linear correlation (r2=0.9216, calculated from a calibration curve), between fluorescent signal (measured by Alamar Blue assay) and number of cells per scaffold.
Figure 4:
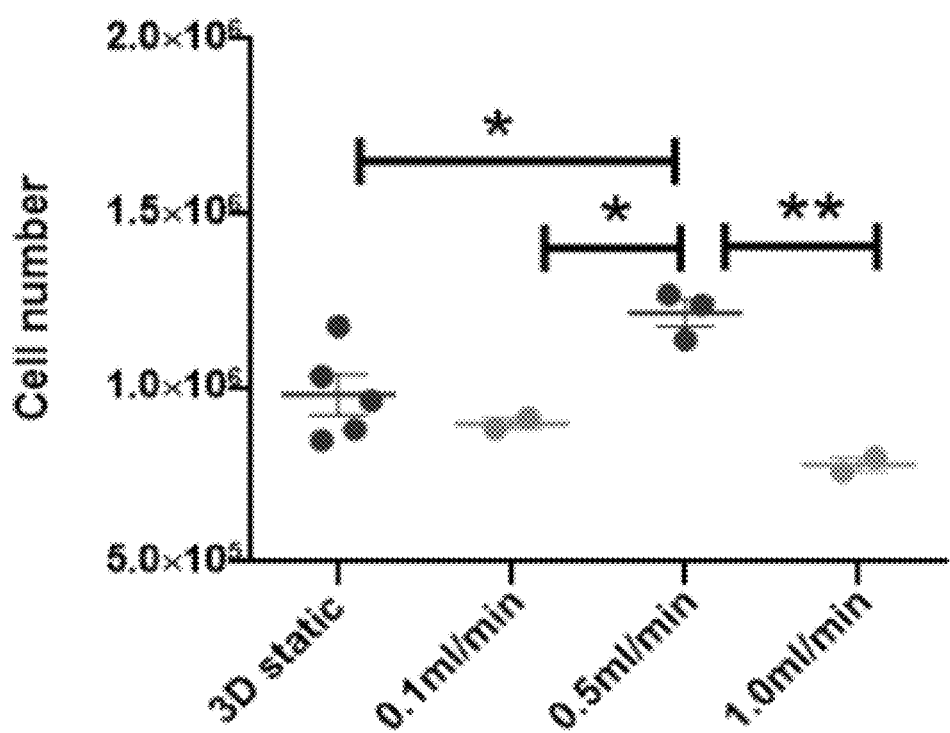
FIG. 4 is a graph illustrating the effect of different flow rates on the number of live cells growing on a 3D scaffold, after two-day exposure to different flow rates. *, **, represent statistical significance of P value≤0.5 and 0.1, respectively.

Cell number after exposure to different flow rates was calculated based on the calibration curve between Alamar Blue assay signal and known number of cells on scaffolds (FIG. 3). Using the linear calibration curve and the Alamar Blue results obtained after exposure of different experimental groups to different flow conditions, the number of DPSCs on the scaffolds was assessed. As shown in FIG. 4, following the exposure to different flow rates, the number of cells was not negatively affected (for both the 0.1 and 1 ml/min flow rates) and even increased significantly (for the flow rate of 0.5 ml/min), compared to the 3D static control.

Example 3—Stem Cell Morphology and Viability

The impact of flow on cell viability, morphology and location on the scaffold was assessed utilizing s100β, the cytoplasmic marker for DPSCs, and visualization of live/dead assay cells under a confocal microscope. Live/Dead assay was conducted utilizing a calcein-AM (1 µmol/L)/ethidium-homodimer-1 (4 µmol/L) viability assay (Sigma-Aldrich). Immunofluorescence of the cytosol of the DPSCs was achieved with anti-s100β antibody (1:200, Sigma, Cat: S2532). DRG neurons were stained with anti-BIII-tubulin (Promega).

Figure 5A:
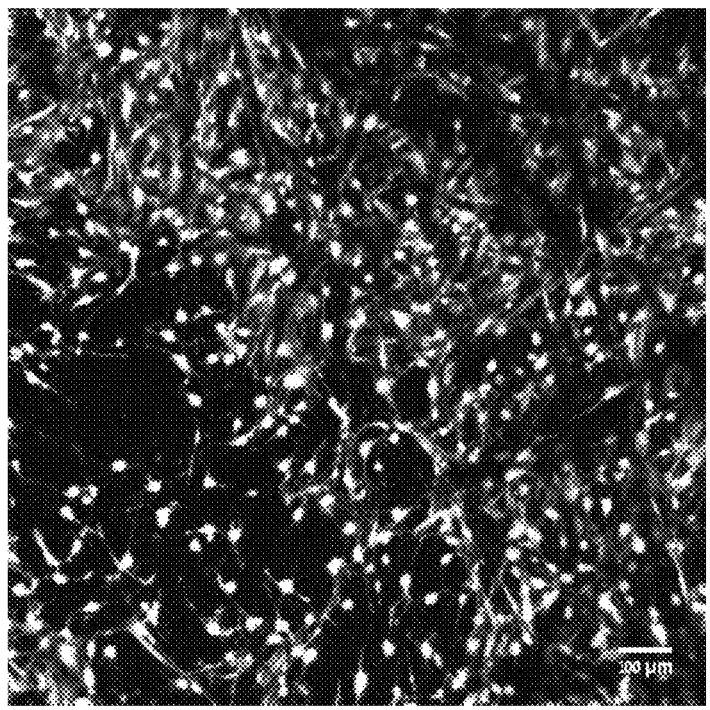
FIGS. 5A to 5D illustrates the viability of DPSCs cultured under different conditions, measured using a Calcein-AM/Ethidium assay: live cells under static 3D (FIG. 5A); dead cells under static 3D (FIG. 5B); live cells under a flow rate of 1 ml/min (FIG. 5C); and dead cells under a flow rate of 1 ml/min (FIG. 5D).
Figure 5B:
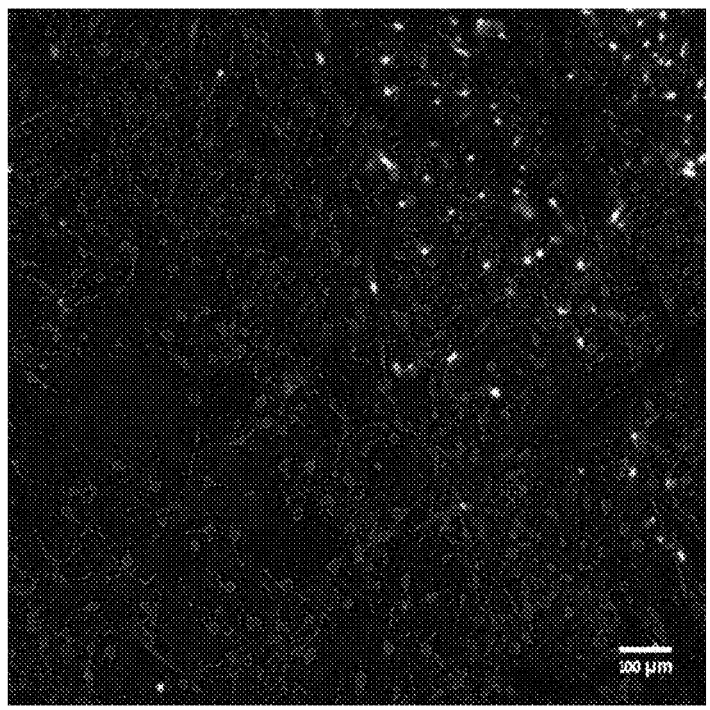
Figure 5C:
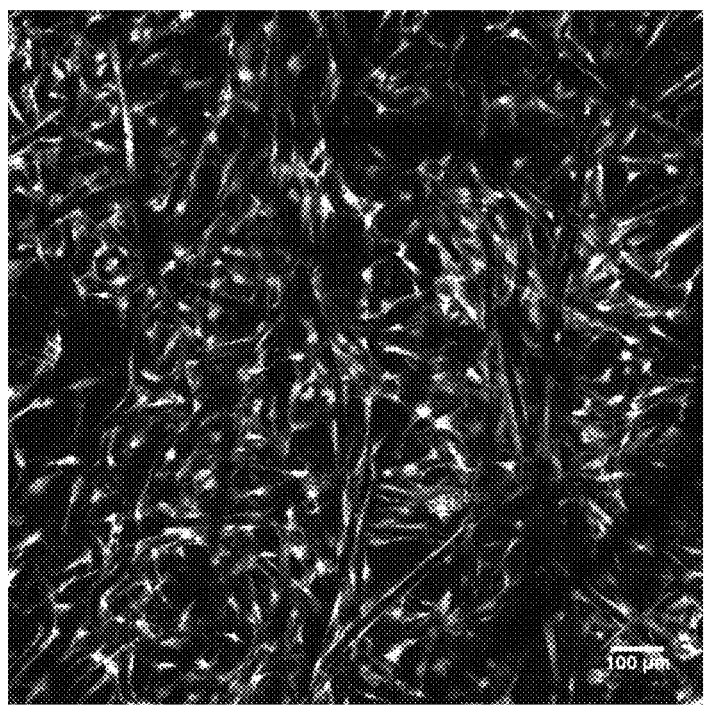
Figure 5D:
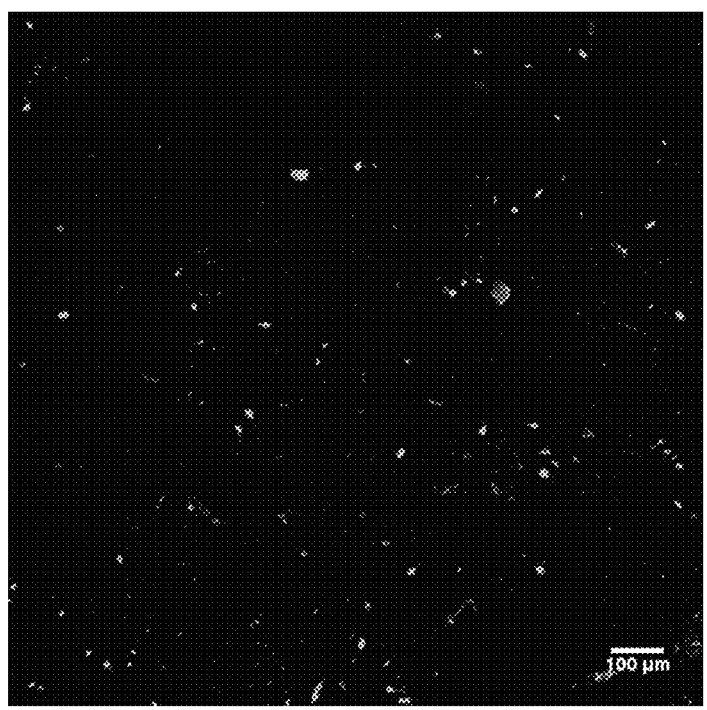

The viability of DPSCs cultured under 3D static control or different flow rates is illustrated at FIGS. 5A-5D. Calcein-AM/Ethidium assay showed live cells (FIGS. 5A and 5C) and dead cells (FIGS. 5B and 5D). It can be seen that the majority (more than about 95%, utilizing a visual assessment) of DPSCs in 3D culture conditions remained viable.

Figure 6A:
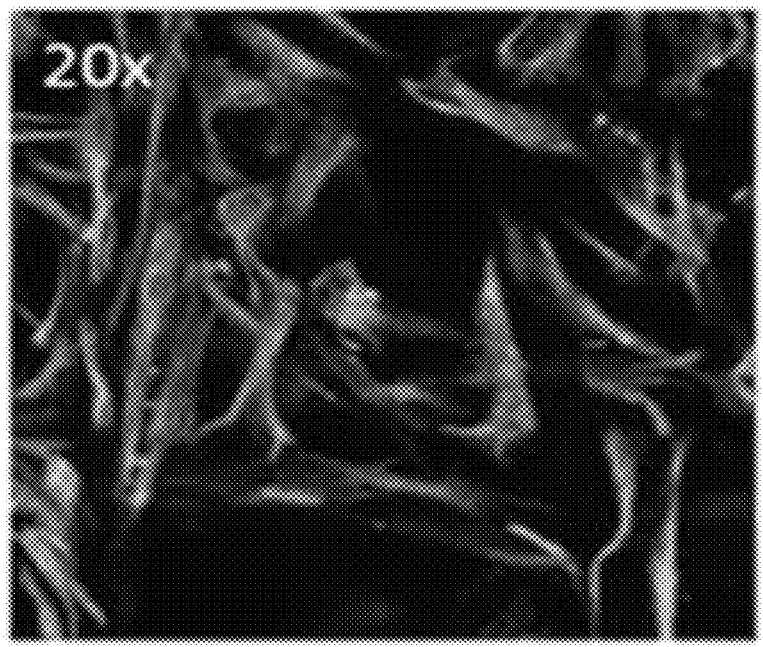
FIGS. 6A and 6B illustrates the morphology of DPSCs cultured for a duration of 2 days under different conditions: 3D static control (FIG. 6A) and 3D at flow rate of 1 ml/min (FIG. 6B) using the markers s100ß for cell cytoplasm and DAPI for cell nucleus.
Figure 6B:
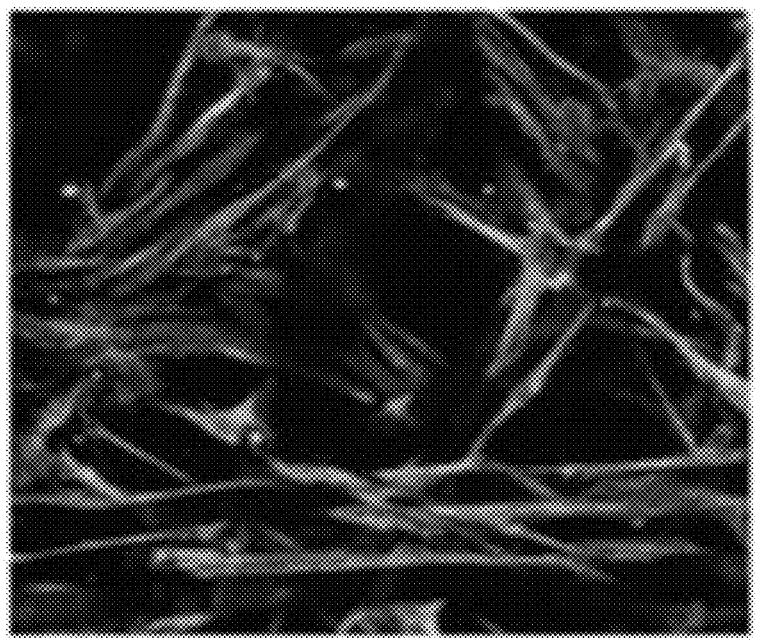

The morphology of DPSCs cultured under 3D static control or different flow rates was also tested. Under the various flow rates, as opposed to the 3D static condition, both cell nucleus (stained by DAPI) and cytoplasm (stained by s100β) obtained an elongated and thin morphology. This morphology change is a typical indication of the cells responding to the shear stress stimuli (FIG. 6B at a flow rate of 1 ml/min), as compared to the 3D static control condition (FIG. 6A).

Example 4—EVs Characterization

EVs were analyzed and characterized using western blot, side-by-side with whole cell lysate, using anti-CD63 and anti-TSG101 antibodies, for staining the corresponding proteins which are considered as EVs markers. Western blot for characterization of isolated EVs was achieved with anti-CD63 (1:100, Abcam, Cat: ab68418) and anti-TSG101 (1:100, Abcam, Cat: ab125011) antibodies.

Figure 7:
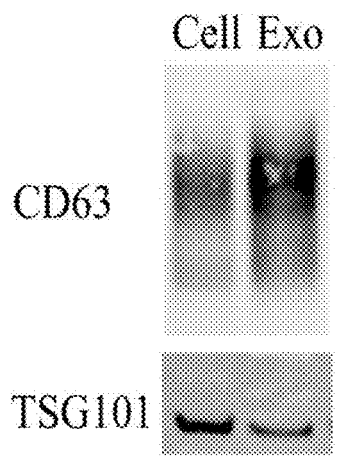
FIG. 7 illustrates western blot analysis of the exosome markers CD63 and TSG101 in isolated exosome (Exo) and in whole cell lysate (Cell).
Figure 8:
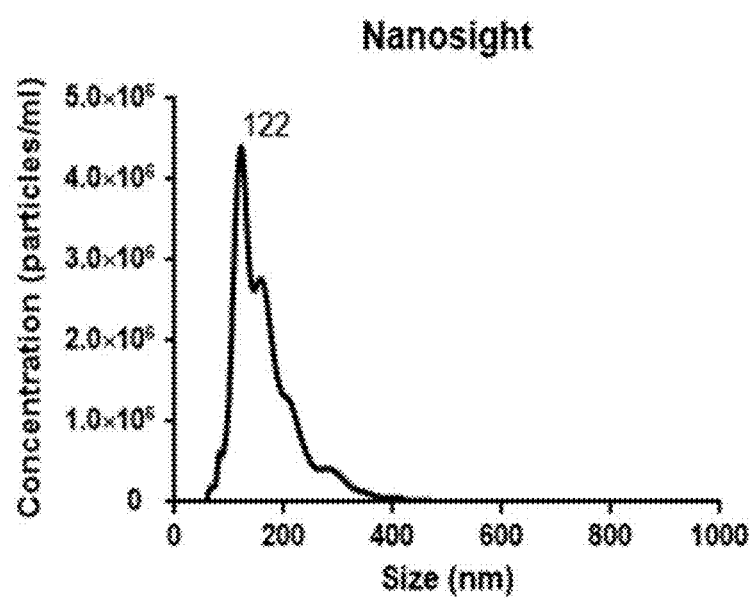
FIG. 8 is a graph depicting the concentration distribution of particles of different sizes, as measured by the Nanosight instrument, after an isolation process. The clear peak visible at 122 nm, is typical of exosomes.

As shown in FIG. 7 the presence of these EV markers was demonstrated, especially the enrichment of CD63. Additionally, a high concentration of isolated particles in the size characteristic of EVs (122 nm), was indicated using the Nanosight instrument (FIG. 8).

Cryogenic-transmission electron microscopy (cryo-TEM) imaging was also performed. A drop (approximately 8 µl) of EV sample was put on a carbon-coated perforated polymer film, supported on a 200 mesh TEM grid. The drop of EV sample was thinned into a thin film and excess solution was blotted with a filer paper. The grid was quickly plunged into liquid ethane and cooled by liquid nitrogen. The vitrified samples were stored in liquid nitrogen until they were subjected to the Zeiss Ultra Plus High-Resolution Cryo-Scanning Electron Microscope.

Cryo-TEM imaging revealed that isolated EVs display typical double-membrane or multiple cup-shaped geometry, with intrinsic heterogeneity in size and structure (FIGS. 18A-F).

Example 5—EVs Yield as a Result of Different Flow Rates

After exposure to different flow rates for 2 days, the medium was collected for EVs isolation and concentration testing. The EVs yield under different flow rates was calculated for each experimental group.

Wall shear stresses (Table 1) were assessed by simulating the mean flow velocity through a micro-computed tomography (µCT) scanned geometry of a 3D porous Fibra-Cell® scaffold. Fibra-Cell® scaffolds (Eppendorf) were scanned using a high-resolution microCT (µCT) scanner (Skyscan 1276, Bruker, Kontich, Belgium), with the following parameters: source voltage of 55 kV, source current of 72 µA, applied filter of aluminum 0.25 mm using a 0.2 degrees rotation step, and a scaled pixel size of 4 µm. Back projections were reconstructed using NRecon (Skyscan, version 1.7.3.0). CTAnn Software (Skyscan, version 1.17.7.2) was used for segmentation, and CTVox (Skyscan, version 3.3.0) for 3D visualization. 3D reconstruction was translated into STL file and drawn in SolidWorks® CAD software. Selected mesh was constructed in GAMBIT. Local wall shear stress was characterized using steady-state CFD simulations performed in FLUENT®, using the pressure-velocity coupled solver.

The scaffolds were pre-treated with iodine and their geometries were imaged and assessed by microCT imaging (FIGS. 17A-B). This enabled the assessment of the shear stress within the scaffolds from the 3D static control and/or flow rates/conditions experimental groups, under computational flow dynamics analysis, and indicated the locally distributed shear stress the cells sensed for producing EVs (FIGS. 17A-B and Table 1).

Figure 9:
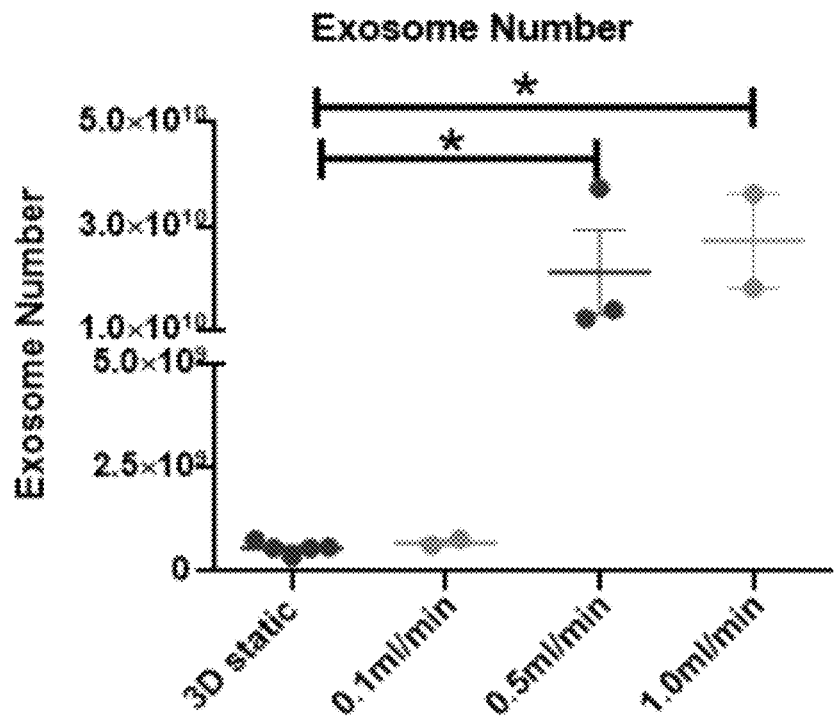
FIG. 9 illustrates the total number of exosomes obtained under different flow rate conditions. * represent statistical significance of P value≤0.5.
Figure 10:
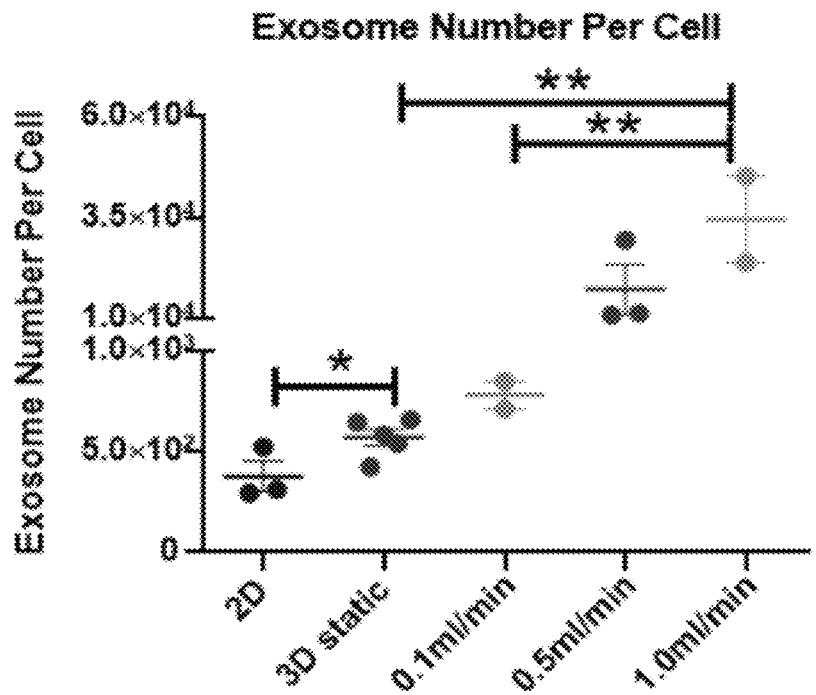
FIG. 10 illustrates the number of exosomes per cell obtained under different flow rate conditions. *, **, represent statistical significance of P value≤0.5 and 0.1, respectively.
Figure 11A:
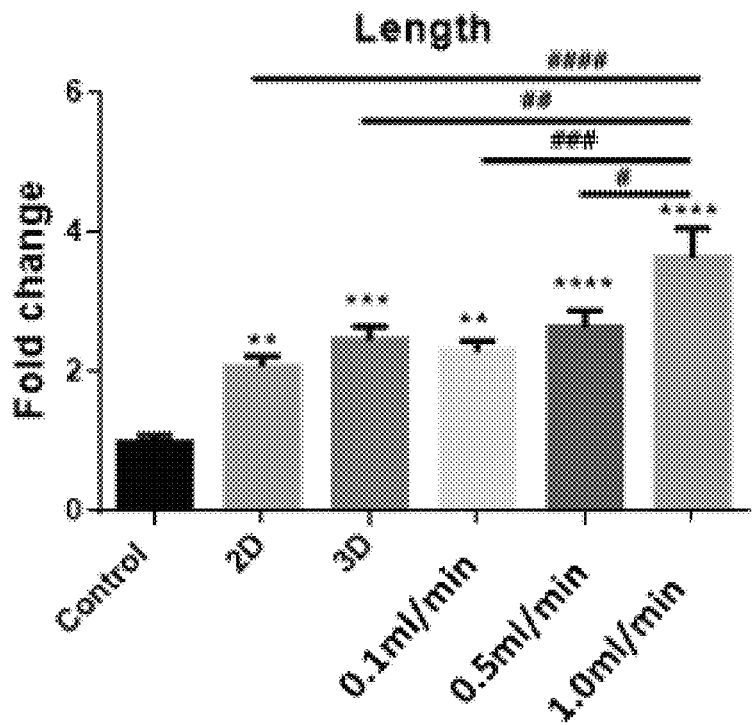
FIGS. 11A to 11F illustrates the effects of exosomes harvested from stem cells subjected to different flow conditions, extension of primary neuron derived from dorsal root ganglia (DRG) of adult female Sprague-dawley rats (200-220 gram). The following parameters were quantified using the Imaris software: Axonal length (FIG. 11A), area (FIG. 11B), volume (FIG. 11C), depth (FIG. 11D), level (FIG. 11E) and number (FIG. 11F). , *, ****, represent statistical significance of P value≤0.01, 0.001, 0.0001, respectively. #, ##, ###, ####represent statistical significance of P value≤0.05, 0.01, 0.001, 0.0001, respectively.
Figure 11B:
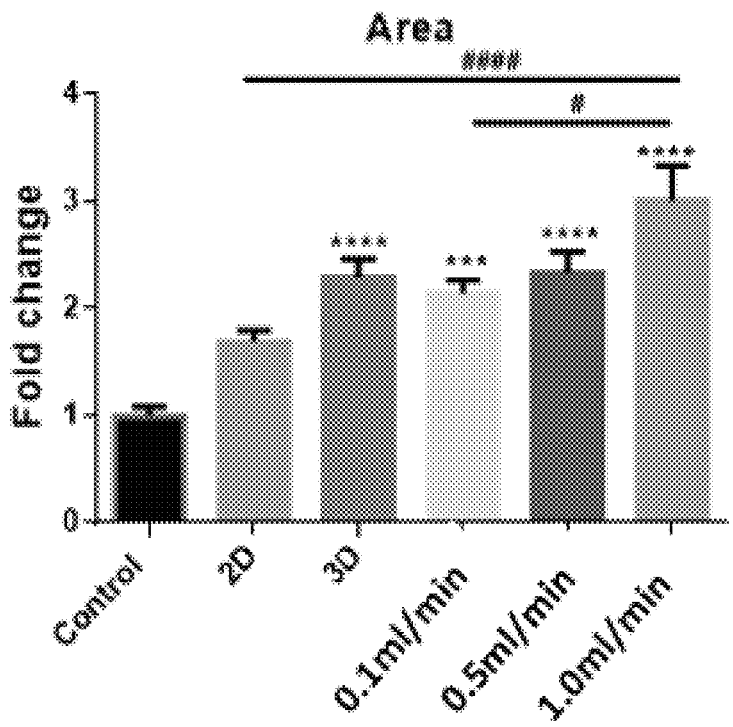
Figure 11C:
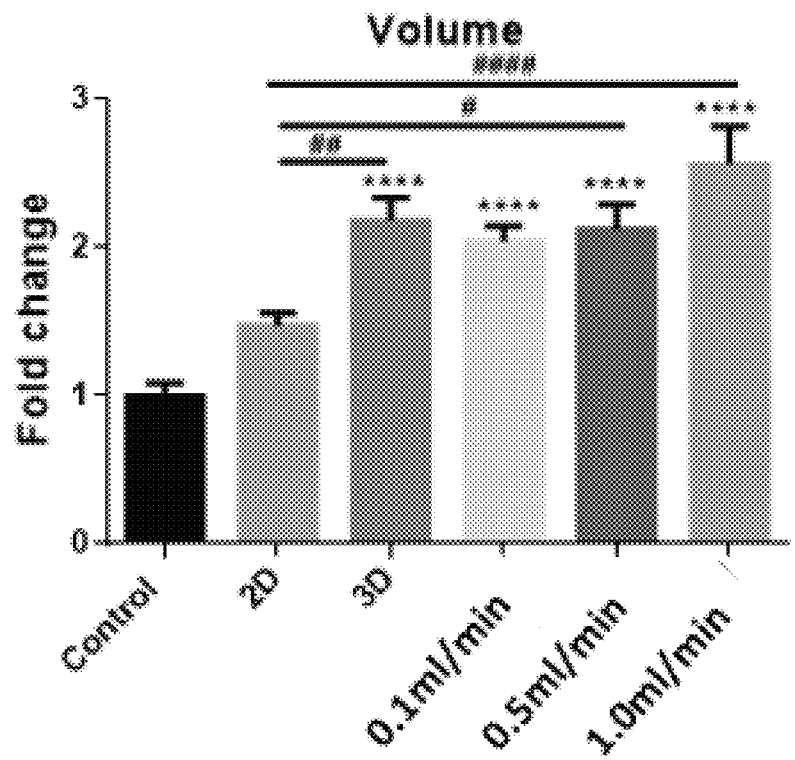
Figure 11D:
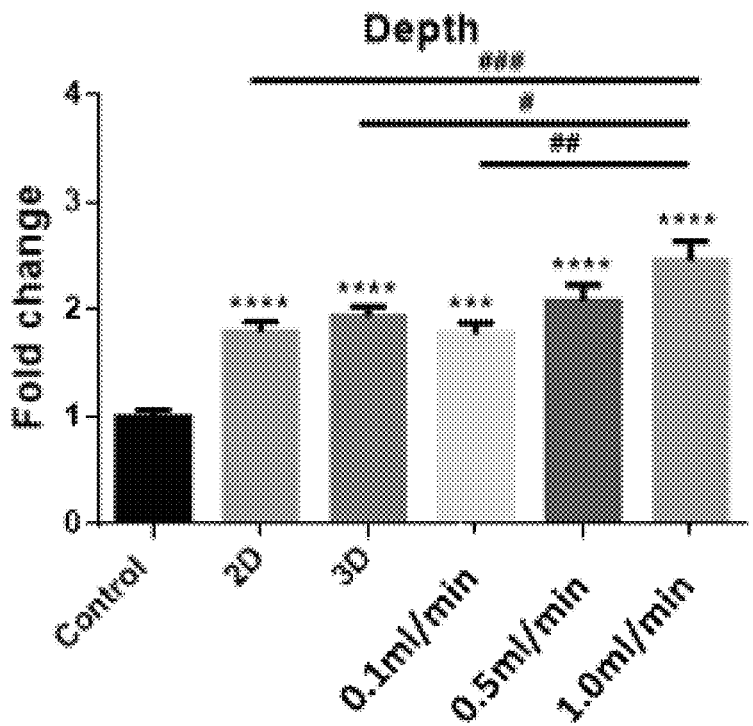
Figure 11E:
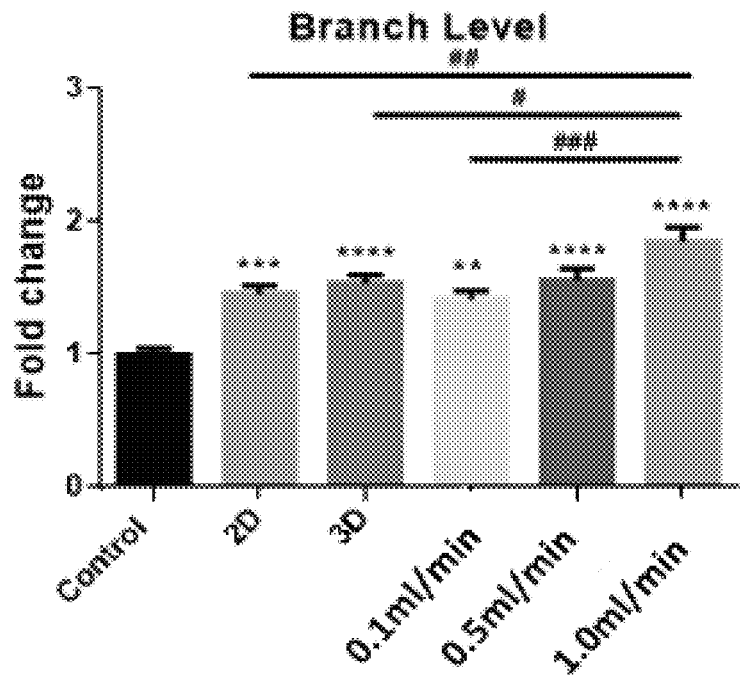
Figure 11F:
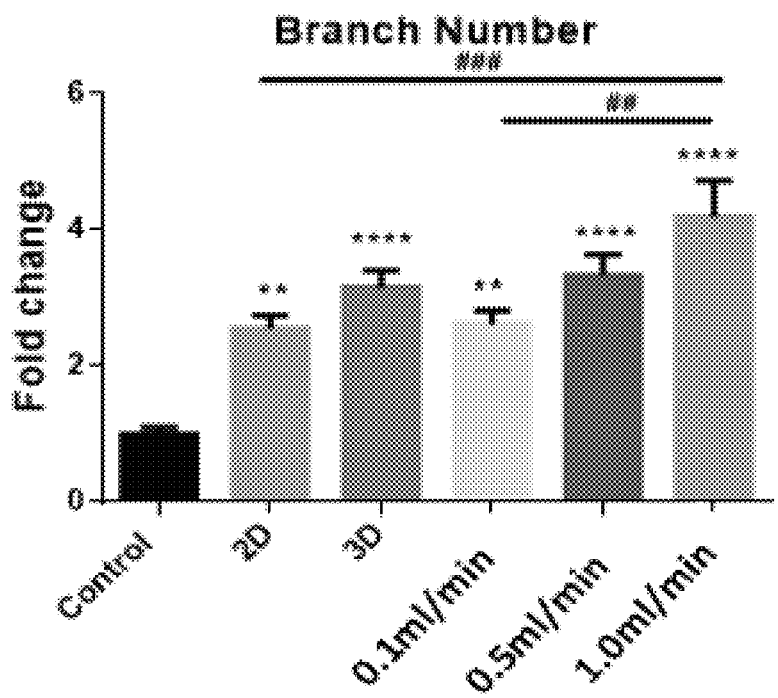

The results demonstrated in FIG. 9 illustrate a significant increase in the number of EVs secreted under the 0.5 ml/min and 1.0 ml/min flow rates. When normalized to cell number, the experimental groups that underwent the flow rates of 0.5 ml/min and 1.0 ml/min demonstrate an EVs secretion that is about 30-60 times higher than compared to the 3D static control (FIG. 10 and Table 1). Additionally, compared to the 2D control, cells grown on 3D scaffolds indicated a 1.5-fold increase in EVs number per cell. It can be concluded that the 3D scaffold enhanced the DPSC EVs production, compared to the 2D environment. It can be also concluded that under certain flow rates, a substantial number of EVs could be generated from the cell-embedded scaffolds.

TABLE 1

EVs results obtained under different flow conditions

| Test group | Pump Rate (RPM) | Mean Velocity (cm/min) | Range of wall shear stresses (Dyne/cm$^2$) | Average EVs Number Per Cell | Fold Change to Static |
|---|---|---|---|---|---|
| 2D | 0 | 0 | 0 | 377.3 | 0.66 |
| 3D Static | 0 | 0 | 0 | 570.0 | 1.00 |
| 0.1 ml/min | 1 | 0.35 | 0.1-0.5 | 780.5 | 1.37 |
| 0.5 ml/min | 5 | 1.77 | 0.5-5 | 17133.0 | 30.06 |
| 1.0 ml/min | 10 | 3.54 | 5-30 | 34250.0 | 60.09 |

Figure 13:
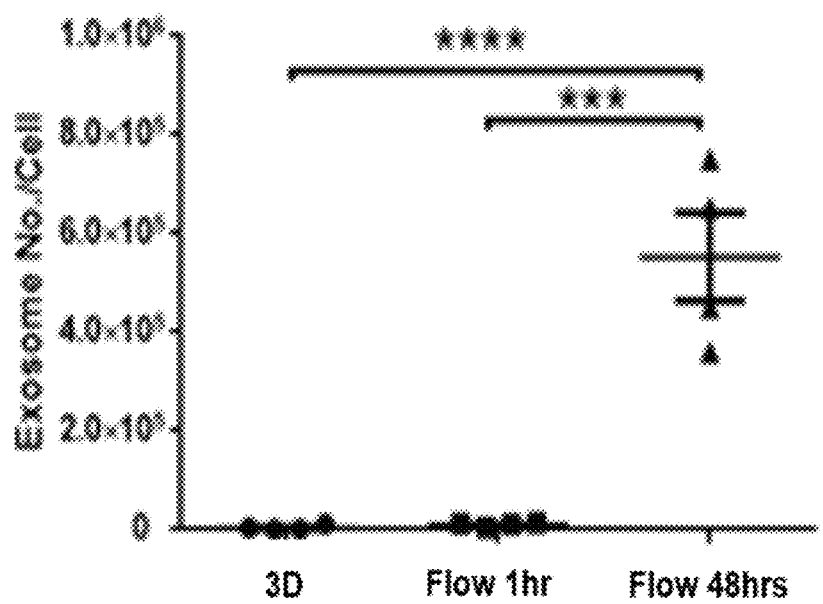
FIG. 13 illustrates the effect of different conditions and flow durations on exosomes number per cell. *, ** represent statistical significance of P value≤0.001, 0.0001, respectively.

Without wishing to be bound to any mechanism of action, it is proposed that the increase in the EVs yield under the higher flow rates of 0.5 ml/min and 1.0 ml/min is a result of biological changes in the stem cells exposed to the process, i.e. a change in gene expression of the DPSCs exposed to the higher flow rates, and not a higher yield caused by elimination of a steric barrier caused by the scaffold, as was indicated by low EVs yields under a short period stimulation (1 hour flow) than compared to a long period stimulation, as shown in FIG. 13.

The EV mean size did not differ significantly among all groups (0.5 ml/min: 172.9±3.048 nm; 1.0 ml/min: 203.2±13.05 nm; 3D: 179.6±8.702 nm; 2D: 161.2±5.502 nm) (FIGS. 19A-B, Table 2).

TABLE 2

| Test Groups | N | Mean (nm) | Mode (nm) | D10 (nm) | D50 (nm) | D90 (nm) |
|---|---|---|---|---|---|---|
| 2D | 7 | 161.2 ± 5.502 | 119.2 ± 3.186 | 101.1 ± 2.504 | 146.0 ± 4.722 | 224.6 ± 17.38 |
| 3D Static | 11 | 179.6 ± 8.702 | 148.6 ± 10.74 | 102.2 ± 6.674 | 166.8 ± 9.632 | 270.5 ± 14.82 |
| 0.5 ml/min | 3 | 172.9 ± 3.048 | 131.7 ± 4.588 | 110.5 ± 1.353 | 156.2 ± 3.557 | 256.5 ± 1.859 |
| 1.0 ml/min | 8 | 203.2 ± 13.05 | 154.6 ± 12.31 | 129.7 ± 8.550 | 184.8 ± 13.43 | 299.6 ± 15.06 |

Size characterization of DPSC-EVs

The mean, mode, D10, D50, and D90 of DPSC-EVs from NTA are presented. D10, D50, D9 represent the diameter of particles that is the 10th, 50th and 90th percentile, respectively.

Example 6—Neurite Sprouting Test

The potency for influencing neurite extensions by the EVs isolated from the experimental groups that were subjected to different flow rates was tested.

Neuron sprouting test was performed by first seeding $5\times10^4$ DRG neurons/well on 24-well plate. $1.7\times10^8$ EVs isolated from experimental groups that were subjected to different flow rates were added into each well, with triplicates per group. 24-h later, neurons were fixated, stained with BIII-tubulin, imaged using fluorescent microscope and quantified using Imaris software. The same number of EVs isolated from experimental groups that were subjected to different flow rates were added to sensory neurons isolated from rat DRG on tissue-culture plate.

EVs harvested under 3D static or various flow rates significantly promoted neuron extensions. Most noticeably, EVs derived from the 1.0 ml/min flow rate induced the most dramatic neuron sprouting, as determined by parameters of length, area, volume, depth, branch level and brunch number (FIGS. 11A-11F).

Example 7—Testing the System and Method on Additional Stem Cell Type

Figure 12:
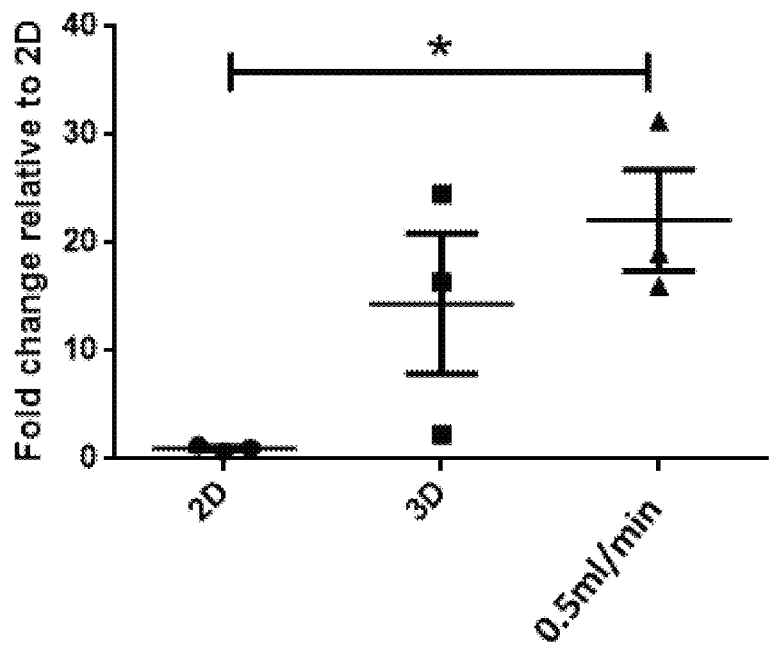
FIG. 12 illustrates relative secretion of MSC-derived exosomes under two-dimensional (2D, as control), static three-dimensional (3D), and 0.5 ml/min flow conditions. * represents statistical significance of P value≤0.05.

An additional stem cell type (human adipose-derived MSCs) was tested utilizing the bioreactor system with the 3D scaffolds, at a flow rate of 0.5 ml/min, and was compared with the 2D control sample. It can be deduced from the results that the flow rate of 0.5 ml/min significantly increased the EVs secretion of MSCs at about 20 times over the 2D control sample (FIG. 12), validating the effect of the method disclosed herein in increasing the secretion yield of various types of EVs.

Example 8—Effect of Flow Duration on EVs Yield

The effect of medium flow duration on EV yield was tested. The medium was collected for EVs isolation and concentration testing, following the duration of 1 hour under the flow rate of 1 ml/min, and was compared to a sample that was exposed to the same flow rate and to the 3D static control, both examined for a duration of 48 hours.

As can be seen in FIG. 13, the sample that was exposed to the flow rate of 1 ml/min for a duration of 48 hours exhibits significantly increased EVs secretion, compared to the 3D static control and the sample which was exposed to the flow rate of 1 ml/min for the duration of 1 hour.

Example 9—3D Engineered Tissue

Figure 14A:
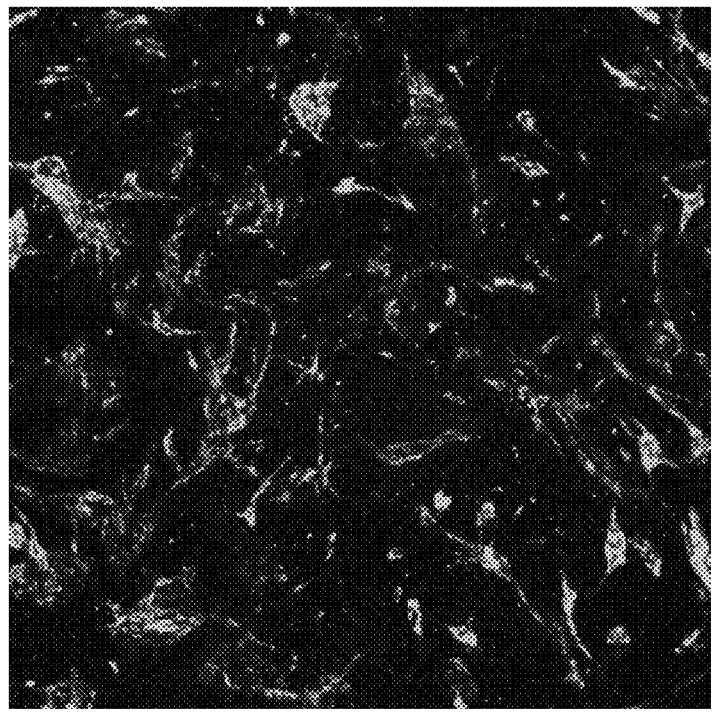
FIGS. 14A to 14F illustrates the formation of vessel network (pro-angiogenic effect) at day 7 form culturing, in a co-culture of human adipose microvascular endothelial cells (light) and fibroblasts, on 3D scaffold composed of Poly-L-lactic acid (PLLA) and poly(lactic-co-glycolic acid (PLGA). The pictures were taken three days after adding equal amounts of media from: control with no exosomes (FIG. 14A); 2D exosome control (FIG. 14B); 3D static exosome control (FIG. 14C); 3D exosome and flow of 0.1 ml/min (FIG. 14D); 3D exosome and flow of 0.5 ml/min (FIG. 14E); and 3D exosome and flow of 1.0 ml/min (FIG. 14F).
Figure 14B:
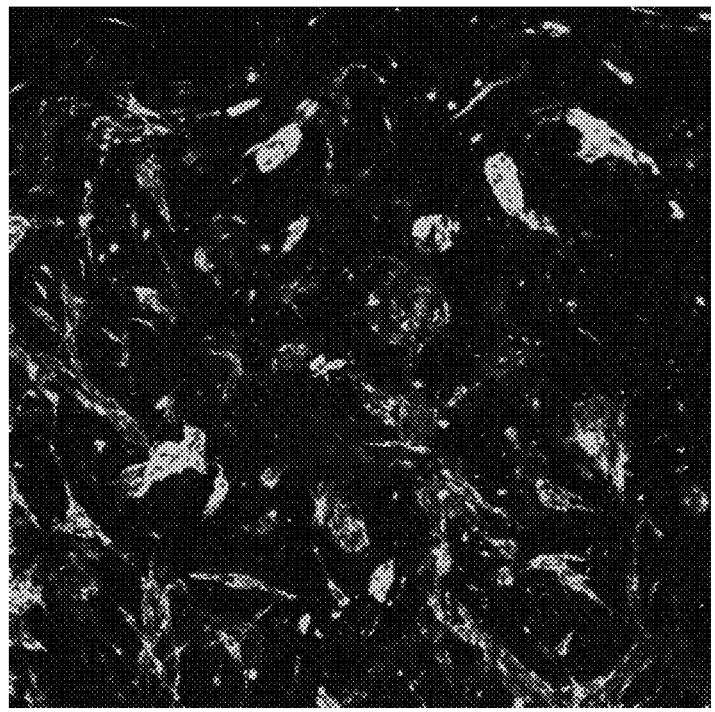
Figure 14C:
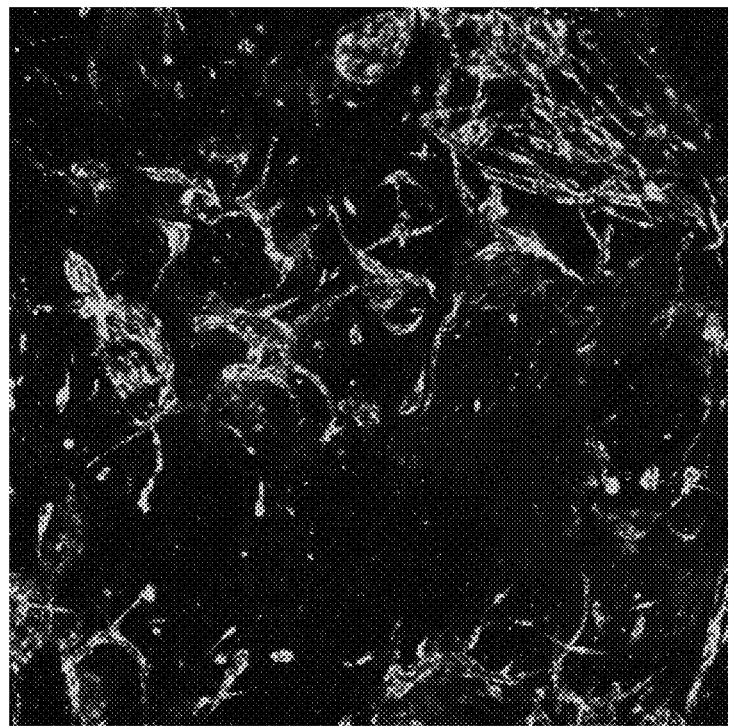
Figure 14D:
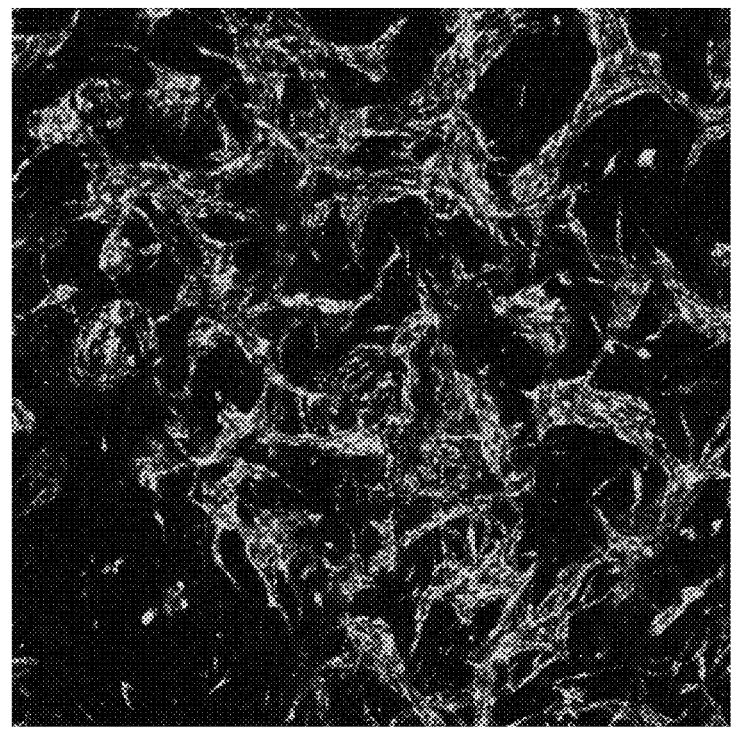
Figure 14E:
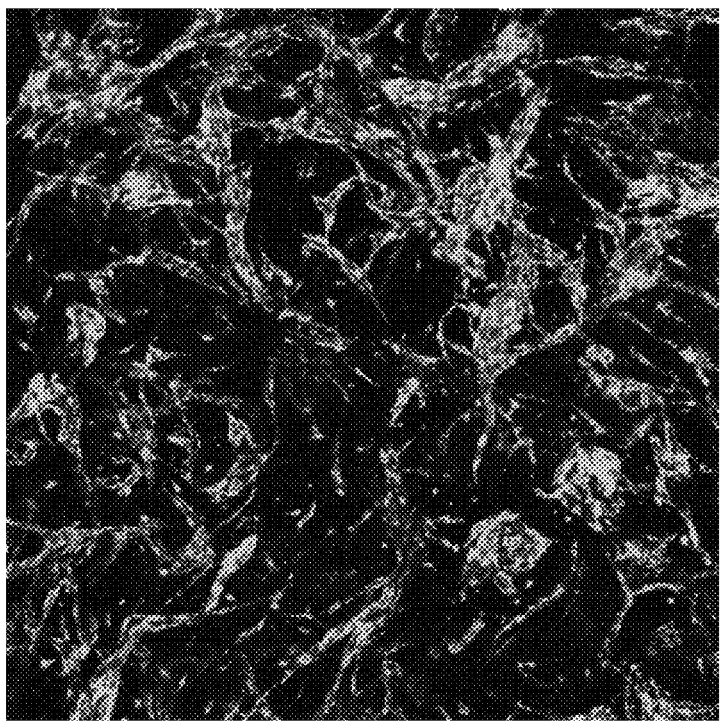
Figure 14F:
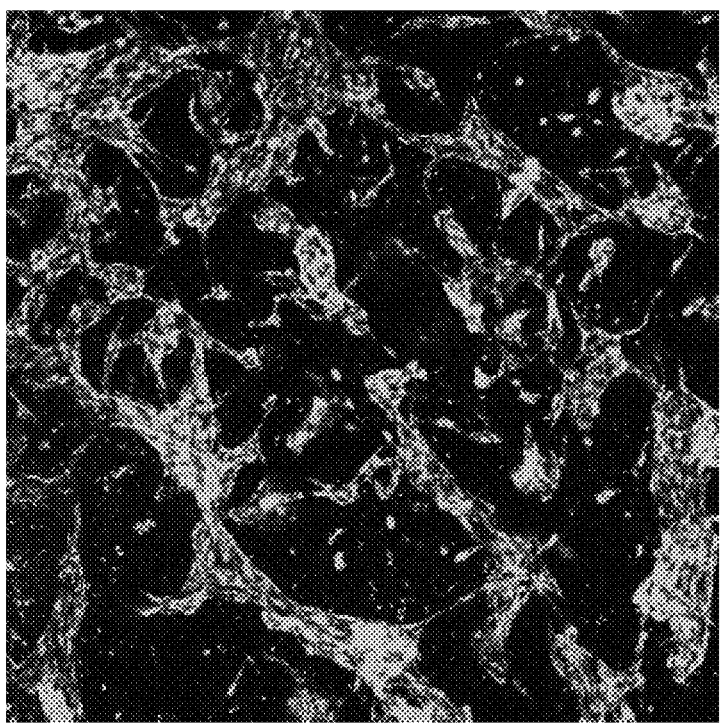

The pro-angiogenic (vascularization) effect of EVs obtained under different flow rates on vessel formation was tested. Equal number of EVs, obtained under different flow rates, were added to 3D PLLA/PLGA scaffolds seeded with human adipose microvascular endothelial cells (HAMEC) and fibroblasts. The results depicted at FIGS. 14A-14F, depicting pictures taken three days after adding the EVs, demonstrate enhanced vascularization in the group treated by the EVs secreted under various flow conditions (0.1 ml/min FIG. 14D; 0.5 ml/min, FIG. 14E; and 1.0 ml/min, FIG. 14F), compared to the control groups with no exosomes (FIG. 14A); 2D exosome control (FIG. 14B); and 3D static exosome control (FIG. 14C).

Example 10—Additional EVs Characterization

In order to characterize key EV markers, MACSplex kit (Miltenyi Biotech) was used (Brahmer, A., et al., Platelets, Endothelial Cells and Leukocytes Contribute to the Exercise-Triggered Release of Extracellular Vesicles into the Circulation. J Extracell Vesicles 2019, 8, 1615820). Briefly, an overnight capture antibody incubation protocol was applied and performed the detection with a combination of CD9, CD63 and CD81 antibodies. FACS analysis was carried out on the BD™ LSR-II Analyzer (BD Biosciences). For the analysis, the surface markers values were compared to the corresponding control antibody included in the kit and considered as the measurement threshold.

For proteomics characterization, EVs isolated from 3D static or flow-stimulated groups (n=3/group) were digested with trypsin and their peptides were analyzed by liquid chromatography-tandem mass spectrometry on a Q-Exactive™ Plus Mass Spectrometer (Thermo Fisher Scientific). Data was analyzed with MaxQuant software (1.5.2.8) with false discovery rate (FDR)<0.01 and additional analysis was done in Perseus. Protein table was filtered to eliminate the identifications from the reverse database, and common contaminants were moved to another tab. The results filtered out proteins that appeared in only one repeat. The intensities were transformed to log 2 and missing values were replaced by 18 in log 2 which was the baseline intensity. A t-test was performed to compare the intensities of the two groups. The differential proteins with Q value less than 0.05 and log 2 fold change above 1 (fold change 2) and at least 2 peptides, were labeled. The Volcano plot was generated with red and blue dots indicating increased and decreased protein expressions in the flow-stimulated group, respectively.

Figure 15A:
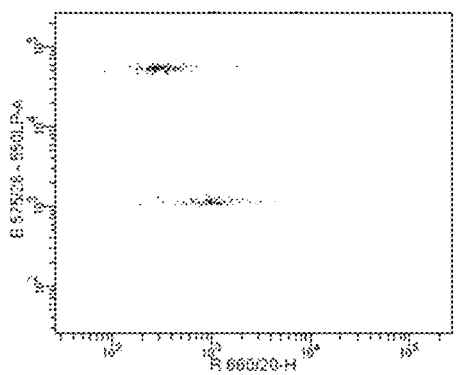
FIGS. 15A to 15C illustrates EV markers characterization: CD9 (FIG. 15A); CD63 (FIG. 15B), and CD81 (FIG.
Figure 15B:
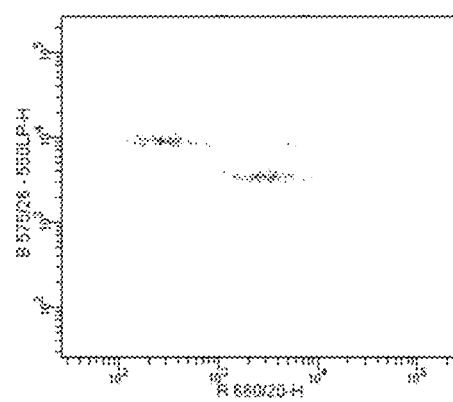
Figure 15C:
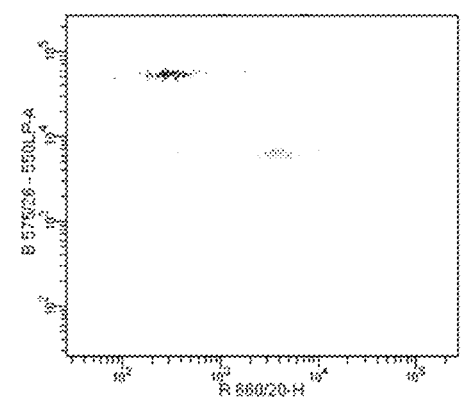

Using FACS, the EVs derived from the engineered DPSCs tissues under mechanical stimulations (i.e., different flow rates experimental groups) were found to be positive for CD9, CD63, and CD81, known EVs markers (FIGS. 15A-C).

Proteomics was performed to compare the protein expressions between EVs from different flow rates groups and static control group. The exosomes obtained under different flow rates have a different proteomic expression than exosomes obtained by other methods. In total, 578 proteins were measured, of which 216 were differentially expressed. Of the differentially expressed proteins, 144 proteins were upregulated whereas 72 were downregulated proteins in the different flow rates groups compared to the static control group EVs (FIGS. 16A-B).

Of the upregulated proteins, several proteins were found, which are related to mechanical stimuli response (Rho), and to mechanical transduction machinery and cell response (integrin, cadherin, cytoskeleton remodeling), including: RhoG (Rho-related GTP-binding protein RhoG); CAPZA2 (F-actin-capping protein subunit alpha-2); ITGAV (Integrin alpha-V; Integrin alpha-V heavy chain; Integrin alpha-V light chain); CKAP5 (Cytoskeleton-associated protein 5); CDH13 (Cadherin-13); ARPC2 (Actin-related protein 2/3 complex subunit 2); ARPC4 (Actin-related protein 2/3 complex subunit 4); MYH11 (Myosin-11); TUBA1B (Tubulin alpha-1B chain); TUBB; TUBB2B, and TUBB2A (Tubulin beta chain; Tubulin beta-2B chain; Tubulin beta-2A chain).

Example 11—YAP-Mediated Mechano-Sensing on Engineered Tissues

Immunofluorescence staining was performed. The scaffolds were fixed in 4% PFA for 15 min, permeabilized with 0.3% Triton™ X-100 (polyethylene glycol tert-octylphenyl ether) for 10 min, and then blocked in 5% BSA solution for 2 h. Next, the scaffolds were incubated with goat-anti-desmin antibody (sc-7559, 1:100) and mouse-anti-YAP (1:100, Santa Cruz) in 5% BSA, overnight, at 4° C. Scaffolds were then incubated with donkey-anti-goat 546 (1:800, Invitrogen) and donkey-anti-mouse-488 (1:400, Invitrogen) and 4',6-diamidino-2-phenylindole (DAPI, 1:1000, Sigma-Aldrich), for 3 h at room temperature. Finally, scaffolds were imaged using confocal microscope (Zeiss LSM700). For YAP inhibitor experiments, $1*10^{-6}$ M verteporfin (Biotest) was added. The activity of YAP in cells has been linked to nuclear transduction of mechanical cues.

To examine the impact of mechanical stimulation on the cells within the scaffolds, YAP staining was performed. YAP staining revealed significant increase of intensity in the DPSCs or MSCs nucleus in the flow-stimulated group of 0.5 ml/min, being 5-6-fold higher than the 3D static group (FIGS. 20A-D).

Figure 20A:
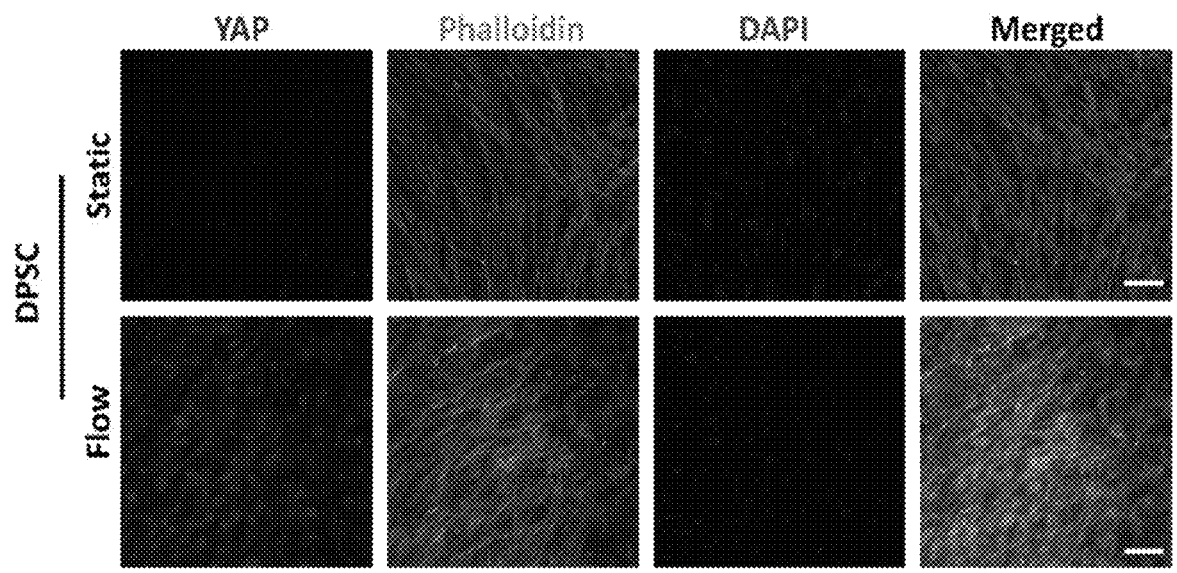
Figure 20B:
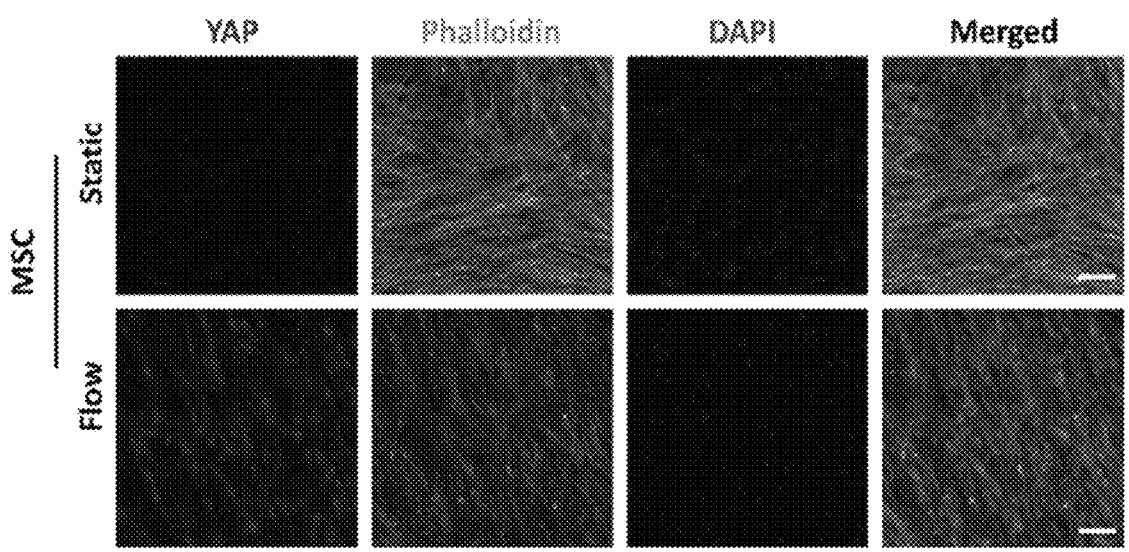
Figure 20C:
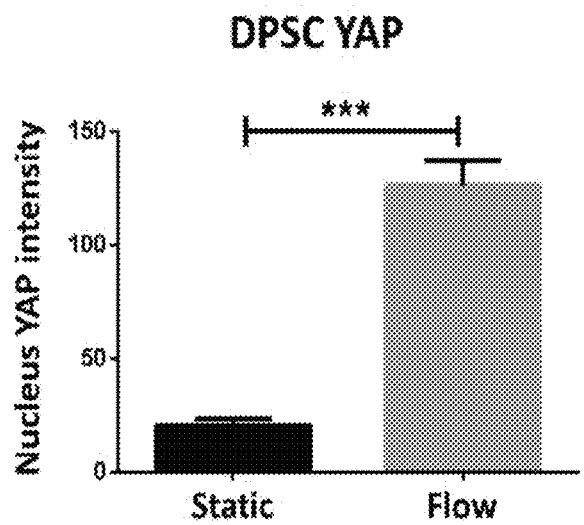
Figure 20D:
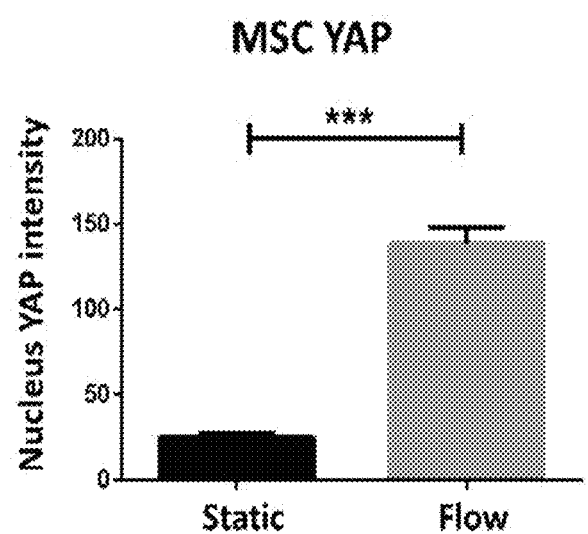
Figure 20E:
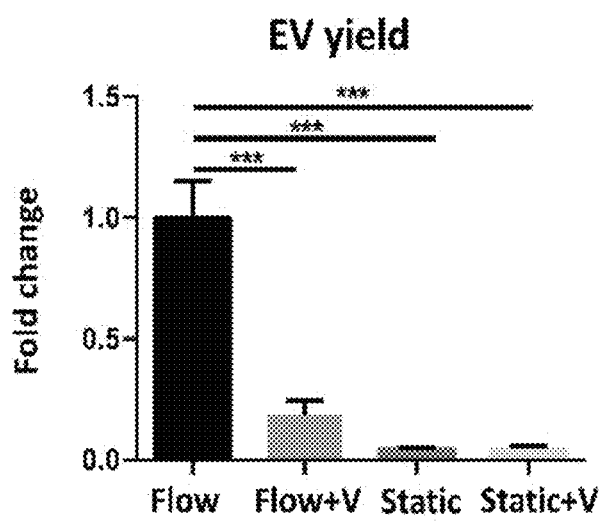

To test if induced production of EVs under flow conditions was mediated by YAP mechano-sensitivity, verteporfin, a YAP inhibitor was added to engineered DPSCs tissues under flow conditions. Subsequently, EV secretions under verteporfin inhibition was significantly decreased (82% reduction) compared to those without inhibition. Additionally, hydrostatic conditions with or without YAP inhibition had significantly lower EV secretion (about 95% less), as compared to flow stimulation without YAP inhibition. In the 3D static group, there was no significant difference between with and without YAP inhibitor (FIG. 20E).

It is contemplated that an enhanced biological effect of flow stimulated DPSC-EVs on promoting axonal sprouting can be observed. This result can resonate with the finding that mechanical cues were able to regulate the paracrine effect of stem cells through YAP-mediated mechanosensing. The accumulation of YAP in the nucleus can be associated with the activation of canonical Wnt signaling pathway. Therefore, the enhanced biological efficacy of EVs derived from flow stimulated, engineered DPSCs tissues could be attributed to YAP-mediated mechanosensing and boosted Wnt signaling. Additionally, the flow stimulated DPSC-EVs could be utilized for the treatment of nerve injuries, such as peripheral neuropathy, spinal cord injuries, and stroke.

The invention claimed is:

1. A method for producing extracellular vesicles (EVs) from an engineered tissue containing stem cells therein, the method comprising the steps of:
    a) embedding a population of stem cells in at least one three-dimensional porous scaffold;
    b) culturing the stem cells on and/or within the at least one three-dimensional porous scaffold for at least 6 days, to expand the scaffold and form at least one connected stem cell multi-layer engineered tissue containing stem cells and EVs therein, wherein the cultured stem cells adhere to the scaffold and/or to each other and secrete EVs;
    c) providing shear stress stimulations in the range of about 5 to about 30 dyne/cm$^2$ to said at least one engineered tissue containing the population of stem cells and EVs, wherein the population of stem cells secretes the EVs into a medium, and wherein the shear stress stimulations induce physiological changes in the cells that result in enhanced secretion of EVs compared to an engineered tissue that was not exposed to shear stress simulations;
    d) collecting the medium containing the secreted EVs; and
    e) isolating the secreted EVs from the medium.

2. The method according to claim 1, wherein the stem cells are cultured on the at least one three-dimensional porous scaffold for at least 9 days to form the engineered tissue containing stem cells and EVs therein prior to providing shear stress stimulations thereto.

3. The method according to claim 1, wherein step (a) further comprises providing a system configured to deliver the medium through the at least one engineered tissue containing the population of stem cells and EVs therein, the system comprising: a flow chamber comprising an inlet port, an outlet port, and at least one flow chamber wall defining an internal chamber; an oxygenator; a medium reservoir comprising the medium; and a pump, wherein the flow chamber, the oxygenator, the medium reservoir and the pump are in fluid communication with each other.

4. The method according to claim 3, wherein at least one of the oxygenator and the flow chamber are disposed within the medium reservoir.

5. The method according to claim 3, wherein step (b) is performed within the flow chamber, wherein the at least one engineered tissue is disposed within the flow chamber.

6. The method according to claim 3, wherein step (c) further comprises flowing the medium into the flow chamber, wherein the medium enters the flow chamber through the inlet port at a predetermined flow rate, flows through the at least one engineered tissue, and exits through the outlet port, thereby applying shear stress stimulations on the population of stem cells and EVs in the engineered tissue.

7. The method according to claim 6, wherein the predetermined flow rate is in the range of about 0.1 to 1.5 ml/min.

8. The method according to claim 6, wherein step (c) further comprises moving the at least one engineered tissue within the flow chamber, thereby providing shear stress stimulations to the population of stem cells and EVs in the engineered tissue, wherein the movement of the at least one engineered tissue within the flow chamber is selected from agitating, vibrating, rotating, waving, or tilting.

9. The method according to claim 6, wherein step (c) is performed for about 1 hour to about 30 days.

10. The method according to claim 1, wherein the at least one engineered tissue comprises at least one material selected from the group consisting of: polyester, polypropylene, polylactic acid (PLA), Poly-L-lactic acid (PLLA), poly(lactic-co-glycolic acid) (PLGA), polycaprolactone (PCL), cellulose, silk, glass, and natural and synthetic hydrogels selected from: gelatin, collagen, fibrin, PEG, alginate, and chitosan.

11. The method according to claim 1, wherein the extracellular vesicles are selected from the group consisting of: exosomes, microvesicles, apoptotic bodies, and ectosomes.

12. The method according to claim 1, wherein the stem cells are naive or engineered human stem cells.

13. The method according to claim 12, wherein the stem cells are selected from the group consisting of: adult stem cells, embryonic stem cells (ESCs), induced pluripotent stem cells, cord blood stem cells, and amniotic fluid stem cells.

14. The method according to claim 13, wherein the adult stem cells are selected from the group consisting of: neural stem cells, skin stem cells, epithelial stem cells, skeleton muscle satellite cells, mesenchymal stem cells, adipose-derived stem cells, endothelial stem cells, dental pulp stem cells (DPSCs), hematopoietic stem cells, and placenta derived stem cells.

15. The method according to claim 11, wherein the extracellular vesicles comprise at least one upregulated protein selected from the group consisting of: RhoG, ITGAV, CAPZA2, CKAP5, CDH13, ARPC2, ARPC4, MYHII, TUBAIB, TUBB, TUBB2B, TUBB2A, and combinations thereof.

16. The method according to claim 11, wherein the extracellular vesicles which were isolated from the medium in step (e) comprise at least one marker selected from CD9, CD63, and CD81, and further comprise at least one upregulated protein selected from the group consisting of: RhoG, ITGAV, CAPZA2, CKAP5, CDH13, ARPC2, ARPC4, MYHII, TUBAIB, TUBB, TUBB2B, TUBB2A, and combinations thereof.

17. A method for producing extracellular vesicles (EVs) from an engineered tissue containing stem cells therein, the method comprising the steps of:
   a) embedding a population of stem cells in at least one three-dimensional porous scaffold;
   b) culturing the stem cells on and/or within the at least one three-dimensional porous scaffold for at least 6 days, to expand the scaffold and form at least one connected stem cell multi-layer engineered tissue containing stem cells and EVs therein, wherein the cultured stem cells adhere to the scaffold and/or to each other and secrete EVs;
   c) delivering a medium to the at least one connected stem cell multi-layer engineered tissue which is disposed in a chamber with the medium delivered at a flow rate in the range of about 0.1 to 1.5 ml/min, thereby providing shear stress stimulations in the range of about 5 to about 30 dyne/cm$^2$ to said at least one engineered tissue containing the population of stem cells and EVs, wherein the population of stem cells secretes the EVs into the medium, and wherein the shear stress stimulations induce physiological changes in the cells that result in enhanced secretion of EVs compared to an engineered tissue that was not exposed to shear stress simulations;
   d) collecting the medium containing the secreted EVs; and
   e) isolating the secreted EVs from the medium.

18. A method for producing extracellular vesicles (EVs) from an engineered tissue containing stem cells therein, the method comprising the steps of:
   a) embedding a population of stem cells in at least one three-dimensional porous scaffold;
   b) culturing the stem cells on the at least one three-dimensional porous scaffold for at least 6 days, to expand the scaffold and form at least one connected stem cell multi-layer engineered tissue containing stem cells and EVs therein, wherein the cultured stem cells adhere to the scaffold and/or to each other while secreting EVs;
   c) providing shear stress stimulations in the range of about 5 to about 30 dyne/cm$^2$ to said at least one engineered tissue containing the population of stem cells and EVs, wherein the population of stem cells secretes the EVs into the medium, and wherein the shear stress stimulations induce physiological changes in the cells that result in enhanced secretion of EVs compared to an engineered tissue that was not exposed to shear stress simulations;
   d) collecting the medium containing the secreted EVs; and
   e) isolating the secreted EVs from the medium,
   wherein step (c) is performed within a chamber with the at least one engineered tissue and medium disposed therein, by moving the at least one engineered tissue within the chamber, thereby providing the shear stress stimulations to the population of stem cells and EVs in the engineered tissue, wherein the movement of the at least one engineered tissue in the chamber is selected from agitating, vibrating, rotating, waving, or tilting.

* * * * *